United States Patent
Gao et al.

(10) Patent No.: US 12,279,304 B2
(45) Date of Patent: Apr. 15, 2025

(54) RANDOM ACCESS PREAMBLE TRANSMISSION METHOD AND APPARATUS

(71) Applicant: HUAWEI TECHNOLOGIES CO., LTD., Guangdong (CN)

(72) Inventors: Kuandong Gao, Chengdu (CN); Mao Yan, Chengdu (CN); Huang Huang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 251 days.

(21) Appl. No.: 17/869,556

(22) Filed: Jul. 20, 2022

(65) Prior Publication Data
US 2022/0361236 A1    Nov. 10, 2022

Related U.S. Application Data

(63) Continuation of application No. PCT/CN2020/073641, filed on Jan. 21, 2020.

(51) Int. Cl.
H04W 74/00    (2009.01)
H04B 17/309    (2015.01)
(Continued)

(52) U.S. Cl.
CPC ........ *H04W 74/002* (2013.01); *H04B 17/309* (2015.01); *H04W 72/54* (2023.01); *H04W 74/0833* (2013.01)

(58) Field of Classification Search
CPC ............... H04W 74/002; H04W 72/54; H04W 74/0833; H04W 52/143; H04W 52/146; H04W 52/10; H04W 52/242; H04W 52/36; H04W 52/42; H04W 52/50; H04W 72/0473; H04W 72/1268; H04W 74/004; H04W 74/006; H04W 24/08;
(Continued)

(56) References Cited

U.S. PATENT DOCUMENTS

2018/0324853 A1    11/2018    Jeon et al.
2018/0376429 A1    12/2018    Islam et al.
(Continued)

FOREIGN PATENT DOCUMENTS

CN    108934064 A    12/2018
CN    109475001 A    3/2019
(Continued)

OTHER PUBLICATIONS

WO 2019/082152 A1 (Year: 2019).*
(Continued)

*Primary Examiner* — Rushil P. Sampat
(74) *Attorney, Agent, or Firm* — Fish & Richardson P.C.

(57) ABSTRACT

This application provides a random access preamble transmission method and an apparatus. In one example method, a terminal receives indication information, and may indicate, with reference to the indication information, whether a first path loss is the same as a second path loss, and determine the first path loss based on the second path loss. Then, the terminal may set, based on a path loss for transmitting a random access preamble between the terminal and a network device, a transmit power for sending the random access preamble.

20 Claims, 9 Drawing Sheets

(51) Int. Cl.
*H04W 72/54* (2023.01)
*H04W 74/0833* (2024.01)

(58) Field of Classification Search
CPC .... H04W 48/12; H04W 76/27; H04B 17/309; H04B 17/318; H04B 7/0695; H04L 5/005; H04L 1/0003; H04L 1/0009; H04L 5/001; H04L 5/0048; H04L 5/0094
See application file for complete search history.

(56) References Cited

U.S. PATENT DOCUMENTS

2020/0077445 A1* 3/2020 Tang ................ H04W 74/0833
2020/0252880 A1* 8/2020 Lei ...................... H04W 52/146
2020/0275479 A1* 8/2020 Peisa ................ H04W 74/0891

FOREIGN PATENT DOCUMENTS

CN 110049557 A 7/2019
CN 110708751 A 1/2020

OTHER PUBLICATIONS

3GPP TS 36.211 V12.4.0 (Dec. 2014), "3rd Generation Partnership Project; Technical Specification Group Radio Access Network; Evolved Universal Terrestrial Radio Access (E-UTRA); Physical channels and modulation (Release 12)," Dec. 2014, 124 pages.
3GPP TS 36.213 V13.0.0 (Dec. 2015), "3rd Generation Partnership Project; Technical Specification Group Radio Access Network; Evolved Universal Terrestrial Radio Access (E-UTRA); Physical layer procedures (Release 13)," Dec. 2015, 326 pages.
ETSI TS 136 212 V13.0.0 (Jan. 2016), "LTE; Evolved Universal Terrestrial Radio Access (E-UTRA); Multiplexing and channel coding (3GPP TS 36.212 version 13.0.0 Release 13)," Jan. 2016, 123 pages.
PCT International Search Report and Written Opinion issued in International Application No. PCT/CN2020/073641 on Oct. 13, 2020, 20 pages (with English translation).
Qualcomm Incorporated, "Outer erasure code use cases and evaluation assumptions," 3GPP TSG-RAN WG1 #85, R1-164703, Nanjing, China, May 23-27, 2016, 6 pages.
ZTE et al., "Some Remaining Issues with SUL," 3GPP TSG RAN WG1 Meeting 91, R1-1720219, Reno, USA, Nov. 27-Dec. 1, 2017, 6 pages.
Extended European Search Report in European Appln No. 20916045.6, dated Dec. 2, 2022, 9 pages.
Alcatel-Lucent Shanghai Bell et al., "Common Search Space on SeNB for Dual Connectivity," 3GPP TSG RAN WG1 Meeting#76, R1-140167, Feb. 10-14, 2014, 4 pages.
EP Communication Pursuant to Article 94(3) EPC in European Appln No. 20916045.6, dated Jun. 10, 2024, 7 pages.

* cited by examiner

RANDOM ACCESS PREAMBLE TRANSMISSION METHOD AND APPARATUS

CROSS-REFERENCE TO RELATED APPLICATIONS

This application is a continuation of International Application No. PCT/CN2020/073641, filed on Jan. 21, 2020, the disclosure of which is hereby incorporated by reference in its entirety.

TECHNICAL FIELD

This application relates to the communication field, and more specifically, to a random access preamble transmission method and an apparatus.

BACKGROUND

Development of mobile services poses increasingly high requirements on a data rate and efficiency of wireless communication. To improve a data rate, a high frequency band is introduced in NR for communication. However, a path loss of the high frequency band in space is large (for example, a signal path loss of a 30 GHz frequency is 100 times greater than a signal path loss of a 3 GHz frequency). Therefore, to reduce impact of a signal path loss, a beamforming technology is used in NR to limit energy of a signal to a beam direction. The beamforming technology can effectively expand a signal transmission distance and range and reduce signal interference, to achieve higher communication efficiency and obtain a higher network capacity.

However, in a communication network in which the beamforming technology is used, a transmit beam and a receive beam need to be matched first, so that a gain of a transmit beam sent by a transmit end to a receive end is maximized. Otherwise, communication efficiency is low. For example, a network device sends a synchronization signal block (SSB) by using an omnidirectional beam, and a terminal receives the SSB by using one beam, so that a matching transmit beam of the network device is found for each receive beam of the terminal. Alternatively, a terminal may send a random access preamble by using an omnidirectional beam, and a network device receives the random access preamble by using one receive beam, so that a matching transmit beam of the terminal is found for each receive beam of the network device.

In a beam matching process, because the terminal cannot learn of a path loss of the random access preamble, the terminal cannot determine a transmit power for sending the random access preamble. In this case, the terminal cannot control a coverage distance of the random access preamble. Consequently, communication efficiency is reduced. Therefore, how to transmit a random access preamble needs to be resolved urgently.

SUMMARY

This application provides a random access preamble transmission method and an apparatus, to control a coverage distance of a random access preamble and improve communication efficiency.

According to a first aspect, a random access preamble transmission method is provided. The method includes: receiving indication information, where the indication information indicates whether a first path loss is the same as a second path loss, the first path loss is a path loss for transmitting a random access preamble, and the second path loss is a path loss for transmitting a synchronization signal block (SSB); and sending the random access preamble, where the random access preamble is used by a terminal to perform random access, a transmit power of the random access preamble is associated with the first path loss, and the first path loss is determined based on the indication information and the second path loss.

The terminal receives the indication information, and may indicate, with reference to the indication information, whether the first path loss is the same as the second path loss, and determine the first path loss based on the second path loss. If the indication information indicates that the second path loss is the same as the first path loss, the terminal may determine the second path loss as the first path loss. For example, if a wide beam and a narrow beam may be used for signal transmission between the terminal and a network device, when the second path loss is the wide beam, the first path loss is the wide beam, or when the second path loss is the narrow beam, the first path loss is the narrow beam. If the indication information indicates that the second path loss is different from the first path loss, the terminal may determine another path loss as the first path loss. In a scenario in which a communication system includes two or more known path losses, if the second path loss is different from the first path loss, the terminal may select one of the plurality of known path losses as the first path loss. For example, if signal transmission between the terminal and a network device has only two forms: a wide beam and arrow beam, when the second path loss is the wide beam, the first path loss is the narrow beam; or when the second path loss is the narrow beam, the first path loss is the wide beam. Then, the terminal may set, based on a path loss (namely, the first path loss) for transmitting a random access preamble between the terminal and the network device, a transmit power for sending the random access preamble, so that a coverage distance of the random access preamble can be flexibly controlled, thereby improving communication efficiency.

In some possible implementations, the indication information includes a repetition field or a non-repetition field, the repetition field is for indicating that the first path loss is the same as the second path loss, and the non-repetition field is for indicating that the first path loss is different from the second path loss.

The terminal may distinguish, based on different fields included in the indication information, between content indicated by the indication information. The field in the indication information may be a field in a conventional technology. In other words, the network device may reuse an existing field in the conventional technology, to reduce signaling overheads.

In some possible implementations, when the indication information indicates that the first path loss is different from the second path loss, the indication information further includes a path loss difference between the first path loss and the second path loss, and the first path loss is determined based on the path loss difference and the second path loss.

The indication information may include the path loss difference between the first path loss and the second path loss, so that the terminal may obtain the first path loss based on the path loss difference and the second path loss, and the network device may flexibly set a value of the second path loss. In this way, the terminal may have a plurality of transmit powers, and the terminal may flexibly control the coverage distance of the random access preamble, to further improve the communication efficiency.

In some possible implementations, the SSB is associated with at least two random access occasions, and the sending the random access preamble includes: sending the random access preamble on at least one of the at least two random access occasions.

The SSB may be associated with one or more random access occasions, and the terminal may send the random access preamble on the random access occasion associated with the SSB. In addition, the network device may use an association relationship between an SSB and a random access occasion, so that different terminals send random access preambles on different random access occasions, to avoid interference between the different terminals in sending the random access preambles.

In some possible implementations, the method further includes: receiving one or more random access response messages associated with the random access preamble, Where the one or more random access response messages are scrambled by using a first radio network temporary identifier RNTI.

The network device may receive one or more random access preambles, and feed back one or more random access response messages to the terminal. The one or more random access response messages may be scrambled by using the first RNTI. In other words, if there are a plurality of random access response messages, the plurality of random access response messages are scrambled by using a same RNTI. In this way, complexity of descrambling an RNTI is reduced.

In some possible implementations, the receiving a random access response message for the random access preamble includes: receiving the random access response message for the random access preamble in a first window, where a start location of the first window is a start location of a random access response window associated with the $1^{st}$ random access occasion of the at least two random access occasions, and an end location of the first window is an end location of a random access response window associated with the last random access occasion of the at least two random access occasions.

In a scenario in which the terminal sends the random access preamble on the at least two random access occasions, the RAR-window may be flexibly set. This avoids a waste of a random access occasion and power consumption overheads of the terminal that are caused by waiting for a random access response message corresponding to a random access preamble in a fixed RAR-window. In other words, flexible setting of the RAR-window reduces the power consumption overheads of the terminal.

In some possible implementations, the method further includes:
  receiving one or more random access response messages associated with the random access preamble, where a first random access response message of the one or more random access response messages is scrambled by using an RNTI corresponding to a first random access occasion of the at least two random access occasions, and the first random access response message is for responding to the random access preamble transmitted on the first random access occasion.

The network device may feed back a plurality of random access response messages to the terminal in one RAR window. An RNTI for scrambling the plurality of random access response messages may be determined based on a random access occasion for sending a random access preamble. In other words, there is a mapping relationship between a random access occasion and an RNTI, to be specific, there is a mapping relationship between an RNTI used by a network device to scramble a first random access response message and a random access occasion on which a first random access preamble corresponding to the first random access response message is located. This helps the terminal identify random access response messages corresponding to different random access preambles.

According to a second aspect, a random access preamble transmission method is provided. The method includes: sending indication information, where the indication information indicates whether a first path loss is the same as a second path loss, the first path loss is a path loss for transmitting a random access preamble, and the second path loss is a path loss for transmitting a synchronization signal block (SSB); and receiving the random access preamble sent by a terminal, where the random access preamble is used by the terminal to perform random access, a transmit power of the random access preamble is associated with the first path loss, and the first path loss is determined based on the indication information and the second path loss.

A network device sends the indication information to the terminal. The terminal may indicate, with reference to the indication information, whether the first path loss is the same as the second path loss, and determine the first path loss based on the second path loss. If the indication information indicates that the second path loss is the same as the first path loss, the terminal may determine the second path loss as the first path loss. For example, if a wide beam and a narrow beam may be used for signal transmission between the terminal and the network device, when the second path loss is the wide beam, the first path loss is the wide beam; or when the second path loss is the narrow beam, the first path loss is the narrow beam. If the indication information indicates that the second path loss is different from the first path loss, the terminal may determine another path loss as the first path loss. In a scenario in which a communication system includes two or more known path losses, if the second path loss is different from the first path loss, the terminal may select one of the plurality of known path losses as the first path loss. For example, if signal transmission between the terminal and the network device has only two forms: a wide beam and a narrow beam, when the second path loss is the wide beam, the first path loss is the narrow beam; or when the second path loss is the narrow beam, the first path loss is the wide beam. Then, the terminal may set, based on a path loss (namely, the first path loss) for transmitting a random access preamble between the terminal and the network device, a transmit power for sending the random access preamble, so that a coverage distance of the random access preamble can be flexibly controlled, thereby improving communication efficiency.

In some possible implementations, the indication information includes a repetition field or a non-repetition field, the repetition field is for indicating that the first path loss is the same as the second path loss, and the non-repetition field is for indicating that the first path loss is different from the second path loss.

The terminal may distinguish, based on different fields included in the indication information, between content indicated by the indication information. The field in the indication information may be a field in a conventional technology. In other words, the network device may reuse an existing field in the conventional technology, to reduce signaling overheads.

In some possible implementations, when the indication information indicates that the first path loss is different from the second path loss, the indication information further includes a path loss difference between the first path loss and the second path loss.

The indication information may include the path loss difference between the first path loss and the second path loss, so that the terminal may obtain the first path loss based on the path loss difference and the second path loss, and the network device may flexibly set a value of the second path loss. In this way, the terminal may have a plurality of transmit powers, and the terminal may flexibly control the coverage distance of the random access preamble, to further improve the communication efficiency.

In some possible implementations, the SSB is associated with at least two random access occasions, and the receiving the random access preamble includes: receiving the random access preamble on at least one of the at least two random access occasions.

The SSB may be associated with one or more random access occasions, and the terminal may send the random access preamble on the random access occasion associated with the SSB. In addition, the network device may use an association relationship between an SSB and a random access occasion, so that different terminals send random access preambles on different random access occasions, to avoid interference between the different terminals in sending the random access preambles.

In some possible implementations, the method further includes: sending one or more random access response messages associated with the random access preamble, where the one or more random access response messages are scrambled by using a first RNTI.

The network device may receive one or more random access preambles, and feed back one or more random access response messages to the terminal. The one or more random access response messages may be scrambled by using the first RNTI. In other words, if there are a plurality of random access response messages, the plurality of random access response messages are scrambled by using a same RNTI. In this way, complexity of descrambling an RNTI is reduced.

In some possible implementations, the method further includes: sending one or more random access response messages associated with the random access preamble, where a first random access response message of the one or more random access response messages is scrambled by using an RNTI corresponding to a first random access occasion of the at least two random access occasions, and the first random access response message is for responding to the random access preamble transmitted on the first random access occasion.

The network device may feed back a plurality of random access response messages to the terminal in one RAR-window. An RNTI for scrambling the plurality of random access response messages may be determined based on a random access occasion for sending a random access preamble. In other words, there is a mapping relationship between a random access occasion and an RNTI, to be specific, there is a mapping relationship between an RNTI used by a network device to scramble a first random access response message and a random access occasion on which a first random access preamble corresponding to the first random access response message is located. This helps the terminal identify random access response messages corresponding to different random access preambles.

According to a third aspect, a random access preamble transmission method is provided. The method includes:

sending a random access preamble on at least two random access occasions in a first window, where the random access preamble is used by a terminal to perform random access; and receiving one or more random access response messages associated with the random access preamble.

The terminal respectively sends the random access preamble on as many random access occasions as possible in one window, to help increase a probability of receiving the random access preamble by a base station.

In some possible implementations, the random access occasions in the first window are random access occasions associated with an SSB.

The first window may include all or some random access occasions associated with the SSB. In other words, a size of the first window is flexibly set, thereby improving flexibility of sending the random access preamble on the random access occasion.

In some possible implementations, the one or more random access response messages are scrambled by using a first radio network temporary identifier RNTI.

If there are a plurality of random access response messages, the plurality of random access response messages are scrambled by using a same RNTI, to reduce signaling overheads for scrambling the random access response messages.

In some possible implementations, a first random access response message of the one or more random access response messages is scrambled by using an RNTI corresponding to a first random access occasion of the at least two random access occasions, and the first random access response message is for responding to the random access preamble transmitted on the first random access occasion.

The terminal may identify random access response messages corresponding to different random access preambles, to improve flexibility of random access preamble transmission.

According to a fourth aspect, a random access preamble transmission method is provided. The method includes:

receiving a random access preamble on at least two random access occasions in a first window, where the random access preamble is used by a terminal to perform random access; and sending one or more random access response messages associated with the random access preamble.

The terminal respectively sends the random access preamble on as many random access occasions as possible in one window, to help increase a probability of receiving the random access preamble by a base station.

In some possible implementations, the random access occasions in the first window are random access occasions associated with an SSB.

The first window may include all or some random access occasions associated with the SSB. In other words, a size of the first window is flexibly set, thereby improving flexibility of sending the random access preamble on the random access occasion.

In some possible implementations, the one or more random access response messages are scrambled by using a first radio network temporary identifier RNTI.

If there are a plurality of random access response messages, the plurality of random access response messages are scrambled by using a same RNTI, to reduce signaling overheads for scrambling the random access response messages.

In some possible implementations, a first random access response message of the one or more random access response messages is scrambled by using an RNTI corresponding to a first random access occasion of the at least two random access occasions, and the first random access response message is for responding to the random access preamble transmitted on the first random access occasion.

The terminal may identify random access response messages corresponding to different random access preambles, to improve flexibility of random access preamble transmission.

According to a fifth aspect, a random access preamble transmission apparatus is provided. The apparatus may be a terminal, or may be a chip in a terminal. The apparatus has a function of implementing the first aspect and the possible implementations of the first aspect. The function may be implemented by hardware, or may be implemented by hardware executing corresponding software. The hardware or the software includes one or more modules corresponding to the foregoing function.

In a possible design, the apparatus includes a transceiver module. The transceiver module may include a receiving module and a sending module. The apparatus further includes a processing module. The transceiver module may be, for example, at least one of a transceiver, a receiver, or a transmitter. The transceiver module may include a radio frequency circuit or an antenna. The processing module may be a processor. Optionally, the apparatus further includes a storage module, and the storage module may be, for example, a memory. When the storage module is included, the storage module is configured to store instructions. The processing module is connected to the storage module, and the processing module may execute the instructions stored in the storage module or instructions from another module, to enable the apparatus to perform the communication method according to any one of the first aspect and the possible implementations of the first aspect. In this design, the apparatus may be the terminal.

In another possible design, when the apparatus is the chip, the chip includes a transceiver module. The transceiver module may include a receiving module and a sending module. The apparatus further includes a processing module. The transceiver module may be, for example, an input/output interface, a pin, or a circuit on the chip. The processing module may be, for example, a processor. The processing module may execute instructions, to enable the chip in the terminal to perform the communication method according to any one of the first aspect and the possible implementations of the first aspect. Optionally, the processing module may execute instructions in a storage module, and the storage module may be a storage module in the chip, for example, a register or a cache. The storage module may alternatively be located inside a communication device but outside the chip, for example, a read-only memory (ROM), another type of static storage device that can store static information and instructions, or a random access memory (RAM).

Any processor mentioned above may be a general-purpose central processing unit (CPU), a microprocessor, an application-specific integrated circuit (ASIC), or one or more integrated circuits configured to control program execution of the communication methods according to the foregoing aspects.

According to a sixth aspect, a random access preamble transmission apparatus is provided. The apparatus may be a network device, or may be a chip in a network device. The apparatus has a function of implementing the second aspect and the possible implementations of the second aspect. The function may be implemented by hardware, or may be implemented by hardware executing corresponding software. The hardware or the software includes one or more modules corresponding to the foregoing function.

In a possible design, the apparatus includes a transceiver module. The transceiver module may include a receiving module and a sending module. The apparatus further includes a processing module. The transceiver module may be, for example, at least one of a transceiver, a receiver, or a transmitter. The transceiver module may include a radio frequency circuit or an antenna. The processing module may be a processor.

Optionally, the apparatus further includes a storage module, and the storage module may be, for example, a memory. When the storage module is included, the storage module is configured to store instructions. The processing module is connected to the storage module, and the processing module may execute the instructions stored in the storage module or instructions from another module, to enable the apparatus to perform the method according to any one of the second aspect or the possible implementations of the second aspect.

In another possible design, when the apparatus is the chip, the chip includes a transceiver module. The transceiver module may include a receiving module and a sending module. The apparatus further includes a processing module. The transceiver module may be, for example, an input/output interface, a pin, or a circuit on the chip. The processing module may be, for example, a processor. The processing module may execute instructions, to enable the chip in the network device to perform the communication method according to any one of the second aspect and the possible implementations of the second aspect.

Optionally, the processing module may execute instructions in a storage module, and the storage module may be a storage module in the chip, for example, a register or a cache. The storage module may alternatively be located inside a communication device but outside the chip, for example, a ROM, another type of static storage device that can store static information and instructions, or a RAM.

Any processor mentioned above may be a CPU, a microprocessor, an application-specific integrated circuit ASIC, or one or more integrated circuits configured to control program execution of the communication methods according to the foregoing aspects.

According to a seventh aspect, a random access preamble transmission apparatus is provided. The apparatus may be a terminal, or may be a chip in a terminal. The apparatus has a function of implementing the third aspect and the possible implementations of the third aspect. The function may be implemented by hardware, or may be implemented by hardware executing corresponding software. The hardware or the software includes one or more modules corresponding to the foregoing function.

In a possible design, the apparatus includes a transceiver module. The transceiver module may include a receiving module and a sending module. The apparatus further includes a processing module. The transceiver module may be, for example, at least one of a transceiver, a receiver, or a transmitter. The transceiver module may include a radio frequency circuit or an antenna. The processing module may be a processor. Optionally, the apparatus further includes a storage module, and the storage module may be, for example, a memory. When the storage module is included, the storage module is configured to store instructions. The processing module is connected to the storage module, and the processing module may execute the instructions stored in the storage module or instructions from another module, to enable the apparatus to perform the communication method according to any one of the third aspect and the possible implementations of the third aspect. In this design, the apparatus may be the terminal.

In another possible design, when the apparatus is the chip, the chip includes a transceiver module. The transceiver module may include a receiving module and a sending module. The apparatus further includes a processing module. The transceiver module may be, for example, an input/output interface, a pin, or a circuit on the chip. The processing module may be, for example, a processor. The processing module may execute instructions, to enable the chip in the terminal to perform the communication method according to any one of the third aspect and the possible implementations of the third aspect. Optionally, the processing module may execute instructions in a storage module, and the storage module may be a storage module in the chip, for example, a register or a cache. The storage module may alternatively be located inside a communication device but outside the chip, for example, a ROM, another type of static storage device that can store static information and instructions, or a RAM.

Any processor mentioned above may be a CPU, a microprocessor, an ASIC, or one or more integrated circuits configured to control program execution of the communication methods according to the foregoing aspects.

According to an eighth aspect, a random access preamble transmission apparatus is provided. The apparatus may be a network device, or may be a chip in a network device. The apparatus has a function of implementing the fourth aspect and the possible implementations of the fourth aspect. The function may be implemented by hardware, or may be implemented by hardware executing corresponding software. The hardware or the software includes one or more modules corresponding to the foregoing function.

In a possible design, the apparatus includes a transceiver module. The transceiver module may include a receiving module and a sending module. The apparatus further includes a processing module. The transceiver module may be, for example, at least one of a transceiver, a receiver, or a transmitter. The transceiver module may include a radio frequency circuit or an antenna. The processing module may be a processor.

Optionally, the apparatus further includes a storage module, and the storage module may be, for example, a memory. When the storage module is included, the storage module is configured to store instructions. The processing module is connected to the storage module, and the processing module may execute the instructions stored in the storage module or instructions from another module, to enable the apparatus to perform the method according to any one of the fourth aspect or the possible implementations of the fourth aspect.

In another possible design, when the apparatus is the chip, the chip includes a transceiver module. The transceiver module may include a receiving module and a sending module. The apparatus further includes a processing module. The transceiver module may be, for example, an input/output interface, a pin, or a circuit on the chip. The processing module may be, for example, a processor. The processing module may execute instructions, to enable the chip in the network device to perform the communication method according to any one of the fourth aspect and the possible implementations of the fourth aspect.

Optionally, the processing module may execute instructions in a storage module, and the storage module may be a storage module in the chip, for example, a register or a cache. The storage module may alternatively be located inside a communication device but outside the chip, for example, a ROM, another type of static storage device that can store static information and instructions, or a RAM.

Any processor mentioned above may be a CPU, a microprocessor, an ASIC, or one or more integrated circuits configured to control program execution of the communication methods according to the foregoing aspects.

According to a ninth aspect, a computer storage medium is provided. The computer storage medium stores program code, and the program code is used to indicate instructions for performing the method according to any one of the first aspect and the possible implementations of the first aspect.

According to a tenth aspect, a computer storage medium is provided. The computer storage medium stores program code, and the program code is used to indicate instructions for performing the method according to any one of the second aspect and the possible implementations of the second aspect.

According to an eleventh aspect, a computer storage medium is provided. The computer storage medium stores program code, and the program code is used to indicate instructions for performing the method according to any one of the third aspect and the possible implementations of the third aspect.

According to a twelfth aspect, a computer storage medium is provided. The computer storage medium stores program code, and the program code is used to indicate instructions for performing the method according to any one of the fourth aspect and the possible implementations of the fourth aspect.

According to a thirteenth aspect, a computer program product including instructions is provided. When the computer program product runs on a computer, the computer is enabled to perform the method according to any one of the first aspect or the possible implementations of the first aspect.

According to a fourteenth aspect, a computer program product including instructions is provided. When the computer program product runs on a computer, the computer is enabled to perform the method according to any one of the second aspect or the possible implementations of the second aspect.

According to a fifteenth aspect, a computer program product including instructions is provided. When the computer program product runs on a computer, the computer is enabled to perform the method according to any one of the third aspect or the possible implementations of the third aspect.

According to a sixteenth aspect, a computer program product including instructions is provided. When the computer program product runs on a computer, the computer is enabled to perform the method according to any one of the fourth aspect or the possible implementations of the fourth aspect.

According to a seventeenth aspect, a communication system is provided. The communication system includes the apparatus according to the fifth aspect and the apparatus according to the sixth aspect.

According to an eighteenth aspect, a communication system is provided. The communication system includes the apparatus according to the seventh aspect and the apparatus according to the eighth aspect.

Based on the foregoing technical solution, the terminal receives the indication information, and may indicate, with reference to the indication information, whether the first path loss is the same as the second path loss, and determine the first path loss based on the second path loss. Then, the terminal may set, based on a path loss (namely, the first path loss) for transmitting a random access preamble between the terminal and the network device, a transmit power for sending the random access preamble, so that a coverage distance of the random access preamble can be flexibly controlled, thereby improving communication efficiency.

DESCRIPTION OF EMBODIMENTS

Figure 1:
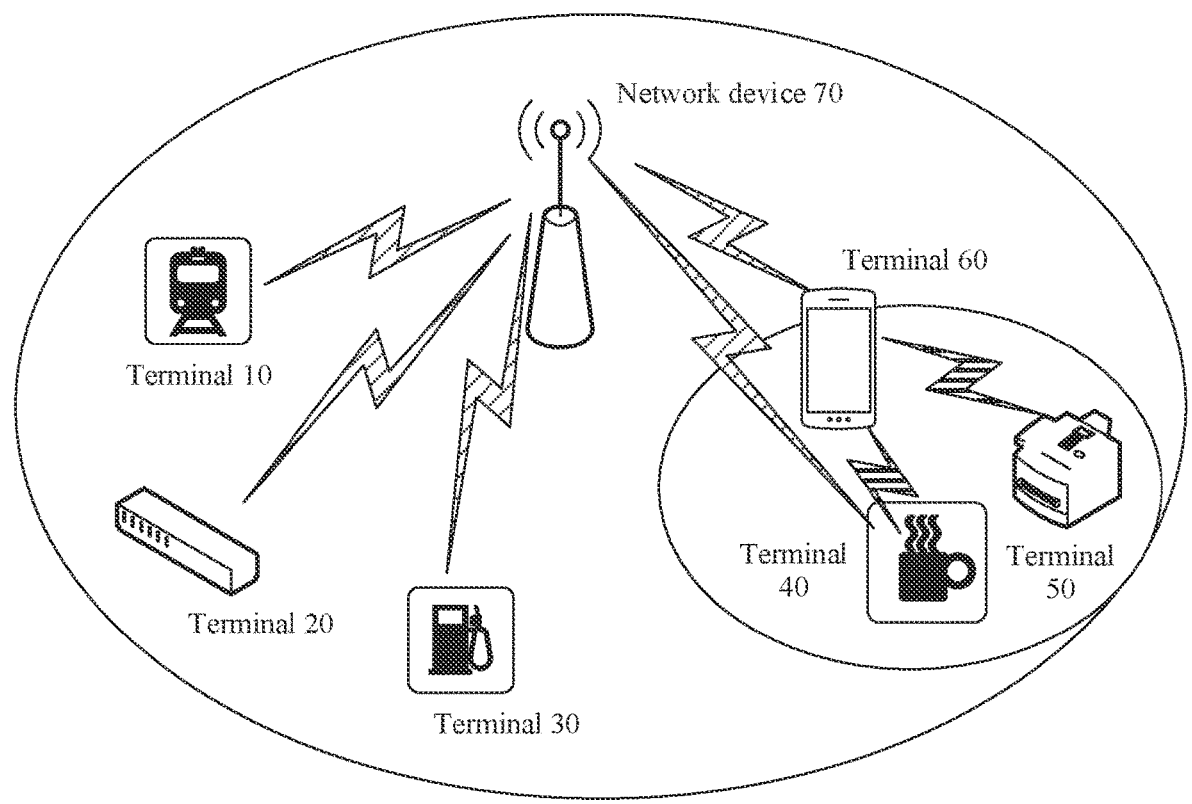
FIG. 1 is a schematic diagram of a communication system according to this application.

The following describes technical solutions of this application with reference to the accompanying drawings.

The technical solutions in embodiments of this application may be applied to various communication systems, for example, a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a future 5th generation (5G) system, or a new radio (NR) system.

The terminal in embodiments of this application may be user equipment, an access terminal, a subscriber unit, a subscriber station, a mobile station, a remote station, a remote terminal, a mobile device, a user terminal, a terminal device, a wireless communication device, a user agent, or a user apparatus. The terminal may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal in a future 5G network, a terminal in a future evolved public land mobile communication network (PLMN), or the like. This is not limited in embodiments of this application.

The network device in embodiments of this application may be a device configured to communicate with the terminal. The network device may be a base transceiver station (BTS) in a global system for mobile communications (GSM) system or code division multiple access (CDMA) system, may be a NodeB (NB) in a wideband code division multiple access (WCDMA) system, or may be an evolved NodeB (eNB or eNodeB) in an LTE, system, or may be a radio controller in a cloud radio access network (CRAN) scenario. Alternatively, the network device may be a relay station, an access point, a vehicle-mounted device, a wearable device, a network device in a future 5G network, a network device in a future evolved PLMN, or one or a group of antenna panels (including a plurality of antenna panels) of a base station in a 5G system, or may be a network node that constitutes a gNB or a transmission point, for example, a baseband unit (BBU) or a distributed unit (DU). This is not limited in embodiments of this application.

In some deployment, the gNB may include a centralized unit (CU) and the DU. The gNB may further include an active antenna unit (AAU). The CU implements some functions of the gNB, and the DU implements some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in an access network (AN), or the CU may be classified into a network device in a core network (CN). This is not limited in this application.

In embodiments of this application, the terminal or the network device includes a hardware layer, an operating system layer running above the hardware layer, and an application layer running above the operating system layer. The hardware layer includes hardware such as a central processing unit (CPU), a memory management unit (MMU), and a memory (which is also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in embodiments of this application is not specifically limited in embodiments of this application, provided that a program that records code of the method provided in embodiments of this application can be run to perform communication according to the method provided in embodiments of this application. For example, the execution body of the method provided in embodiments of this application may be the terminal or the network device, or may be a functional module that can invoke the program and execute the program in the terminal or the network device.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, a computer-readable medium may include but is not limited to: a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a wireless channel, and various other media that can store, include, and/or carry instructions and/or data.

FIG. 1 is a schematic diagram of a communication system according to this application. The communication system in FIG. 1 may include at least one terminal (for example, a terminal 10, a terminal 20, a terminal 30, a terminal 40, a terminal 50, and a terminal 60) and a network device 70. The network device 70 is configured to provide a communication service for the terminal and access a core network. The terminal may access a network by searching for a synchronization signal, a broadcast signal, or the like sent by the network device 70, to communicate with the network. The terminal 10, the terminal 20, the terminal 30, the terminal 40, and the terminal 60 in FIG. 1 may perform uplink and downlink transmission with the network device 70. For example, the network device 70 may send downlink signals to the terminal 10, the terminal 20, the terminal 30, the terminal 40, and the terminal 60, or may receive uplink signals sent by the terminal 10, the terminal 20, the terminal 30, the terminal 40, and the terminal 60.

In addition, the terminal 40, the terminal 50, and the terminal 60 may also be considered as a communication system. The terminal 60 may send downlink signals to the terminal 40 and the terminal 50, or may receive uplink signals sent by the terminal 40 and the terminal 50.

It should be noted that embodiments of this application may be applied to a communication system including one or more network devices, or may be applied to a communication system including one or more terminals. This is not limited in this application.

It should be understood that the communication system may include one or more network devices. One network device may send data or control signaling to one or more terminals. A plurality of network devices may simultaneously send data or control signaling to one or more terminals.

The following describes terms in this application in detail.
1. Beam:

The beam in an NR protocol may be embodied as a spatial domain filter that is also referred to as a spatial filter or a spatial parameter. A beam used to send a signal may be referred to as a transmit beam (Tx beam), or may be referred to as a spatial domain transmit filter or a spatial transmit parameter. A beam used to receive a signal may be referred to as a receive beam (Rx beam), or may be referred to as a spatial domain receive filter or a spatial receive parameter (spatial Rx parameter).

The transmit beam may refer to signal strength distribution formed in different directions in space after a signal is transmitted through an antenna, and the receive beam may refer to signal strength distribution, in different directions in space, of a radio signal received through an antenna.

In addition, the beam may be a wide beam, a narrow beam, or a beam of another type. A technology for forming the beam may be a beamforming technology or another technology. The beamforming technology may be specifically a digital beamforming technology, an analog beamforming technology, a hybrid digital/analog beamforming technology, or the like.

The beam usually corresponds to a resource. For example, during beam measurement, a network device measures different beams by using different resources, a terminal feeds back measured resource quality, and the network device knows quality of a corresponding beam. During data transmission, beam information is also indicated through a resource corresponding to the beam information. For example, the network device indicates information about a PDSCH beam to the terminal through a resource in a TCI of DCI.

Optionally, a plurality of beams that have a same communication feature or similar communication features are considered as one beam. One beam may include one or more antenna ports, configured to transmit a data channel, a control channel, a sounding signal, and the like. The one or more antenna ports forming the beam may also be considered as an antenna port set.

During beam measurement, each beam of the network device corresponds to one resource. Therefore, an index of the resource may be used to uniquely identify a beam corresponding to the resource.

2. Resource:

During beam measurement, a beam corresponding to a resource may be uniquely identified by using an index of the resource. The resource may be an uplink signal resource, or may be a downlink signal resource. An uplink signal includes but is not limited to a sounding reference signal (SRS) and a demodulation reference signal (DMRS). A downlink signal includes but is not limited to a channel state information reference signal (CSI-RS), a cell specific reference signal (CS-RS), a UE specific reference signal (US-RS), a demodulation reference signal (DMRS), and a synchronization signal/physical broadcast channel block (SS/PBCH block). The SS/PBCH block may be referred to as a synchronization signal block (SSB) for short.

The resource is configured by using radio resource control (RRC) signaling. In a configuration structure, a resource is a data structure, including a related parameter of an uplink/ downlink signal corresponding to the resource, for example, a type of the uplink/downlink signal, a resource element that carries the uplink/downlink signal, sending time and a sending periodicity of the uplink/downlink signal, and a quantity of ports used to send the uplink/downlink signal. Each resource of the uplink/downlink signal has a unique index, to identify the resource of the uplink/downlink signal. It may be understood that the index of the resource may also be referred to as an identifier of the resource. This is not limited in embodiments of this application.

3. Quasi-Co-Location (QCL):

A co-location relationship is used to indicate that a plurality of resources have one or more same or similar communication features. For a plurality of resources that have the co-location relationship, a same or similar communication configuration may be used. For example, if two antenna ports have the co-location relationship, a large-scale channel property in which one port transmits a symbol may be inferred from a large-scale channel property in which the other port transmits a symbol. The large-scale property may include a delay spread, an average delay, a Doppler spread, a Doppler shift, an average gain, a receive parameter, a receive beam number of a terminal, a transmit/receive channel correlation, an angle of arrival, a spatial correlation of a receiver antenna, a dominant angle of arrival (AoA), an average angle of arrival, an AoA spread, and the like. A quasi-co-location parameter includes at least one of a Doppler spread, a Doppler shift, an average delay, a delay spread, and a space domain receive parameter. QCL relationships may be classified into four types: 'QCL-Type A': {a Doppler shift, a Doppler spread, an average delay, a delay spread}, 'QCL-Type B': {a Doppler shift, a Doppler spread}; 'QCL-Type C': {a Doppler shift, an average delay}; and 'QCL-Type D': {a space domain receive parameter}.

A message 1 (Msg 1) is a random access preamble (a preamble or a sequence), and is carried on a physical random access channel (PRACH). The Msg 1 is usually used to initiate a connection request, a handover request, a synchronization request, or a scheduling request between a device and a network.

A message 2 (Msg 2) is also referred to as a random access response (RAR) message. The Msg 2 is a response of a network side to a received message 1, and one message 2 may be used to respond to a plurality of Msgs 1. If the network side receives the message 1, the network side encapsulates and sends at least one piece of the following information: an index (random access preamble identity, RAPID) of the message 1, an uplink scheduling grant (uplink grant), timing advance, a temporary cell radio network temporary identifier (TC-RNTI), and the like. The network side may respond to the plurality of Msgs 1 in a same Msg 2. A protocol-specified RAR-window is used to receive a message 2. If a terminal does not receive the message 2 within RAR-window duration, the terminal considers that a message 1 fails to be sent. A random access-radio network temporary identifier (RA-radio network temporary identity, RA-RNTI) is used to scramble a PDCCH of a message 2. A terminal may identify a message 2 of the terminal based on an RA-RNTI. Each RA-RNTI corresponds one-to-one to an RO, and generation of the RA-RNTI is related to a time-frequency resource location of the RO.

Configuration information in the present invention may be configured by the network device and delivered to the terminal. The configuration information may be carried on any one of a physical broadcast channel (PBCH), remaining minimum system information (RMSI), a system information block (SIB) 1, an SIB 2 and an SIB 3, a media access control-control element (MAC-CE), downlink control information (DCI), radio resource control (RRC), and system information. An association relationship in embodiments of this application may alternatively be specified in a standard, or may be pre-agreed on by the network device and the terminal.

The synchronization signal block may also be referred to as a synchronization signal/physical broadcast channel block (SS/PBCH block), may also be referred to as an SSB for short, and may include at least one of a PBCH, a primary synchronization signal (PSS), and a secondary synchronization signal (SSS).

It should be noted that, with continuous development of technologies, the terms in embodiments of this application may change, but all of them shall fall within the protection scope of this application.

To facilitate understanding the technical solutions in this application, technologies related to this application are first briefly described.

Figure 2:
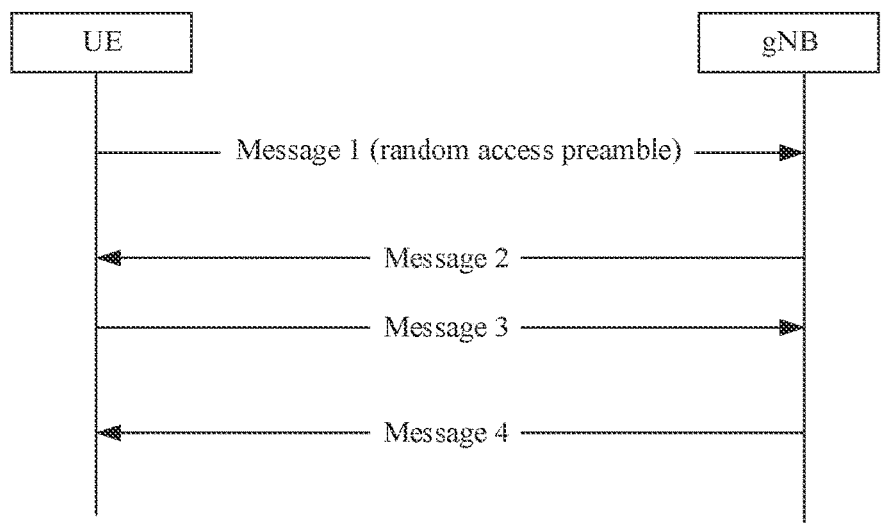
FIG. 2 is a schematic diagram of a random access process of a four-step random access type in a conventional solution.

FIG. 2 is a schematic diagram of a random access process of a four-step random access type in a conventional solution. After selecting a suitable cell and camping on the cell, a terminal may initiate random access. As shown in FIG. 2, UE sends a message 1 (represented as msg 1 for short) to a network device. The message 1 is a random access preamble. After detecting the random access preamble, the network device returns a response message, namely, a message 2, to the UE. The message 2 includes an uplink resource allocated by the network device to the UE. After receiving the message 2, the UE sends a message 3 on the uplink resource indicated by the message 2. If the network device can correctly decode the message 3, the network device returns a message 4 to the UE, where the message 4 is used to notify the UE that contention succeeds. After the foregoing four steps, the random access process succeeds.

Figure 3:
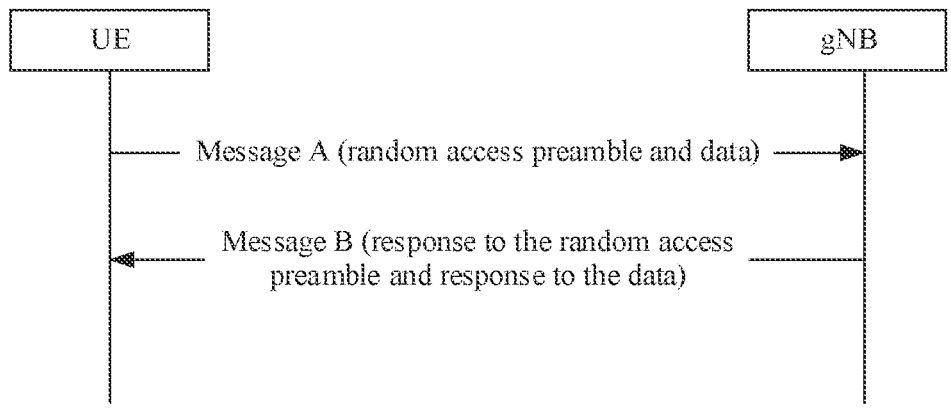
FIG. 3 is a schematic diagram of a random access process of a two-step random access type in a conventional solution.

FIG. 3 is a schematic diagram of a random access process of a two-step random access type in a conventional solution. In a two-step random access process, UE carries both a random access preamble and data (namely, a preamble and data) in a message A. The data part is used for contention resolution, and may be, for example, a radio resource control (RRC) message. If there is no conflict between UE, a network device returns a message B to the UE after successfully decoding the message 1. The message B includes both a response to the random access preamble and a response to the data. The response to the random access preamble is a random access response (RAR). The response to the data is usually an RRC message. The two responses may be sent simultaneously, or may be sent successively. The UE may separately decode the two responses. After receiving the message 2, the UE learns that random access succeeds. If there is a conflict between the UE, the network device may fail to obtain the data in the message A through decoding. In this case, the network device does not send the message 2 to the UE. After sending the message 1, the UE waits for a time window. If the UE does not receive the message 2, the UE considers that the random access fails.

In the conventional solution, in a beam matching process, a network device sends an SSB by using an omnidirectional beam, and a terminal receives the SSB by using one beam, so that a matching transmit beam of the network device is found for each receive beam of the terminal. Alternatively, a terminal may send a random access preamble by using an omnidirectional beam, and a network device receives the random access preamble by using one receive beam, so that a matching transmit beam of the terminal is found for each receive beam of the network device. However, because the terminal cannot learn of a path loss of the random access preamble, the terminal cannot determine a transmit power for sending the random access preamble. In this case, the terminal cannot determine a coverage distance of the random access preamble. Consequently, communication efficiency is reduced. Therefore, how to transmit a random access preamble needs to be resolved urgently.

Figure 4:
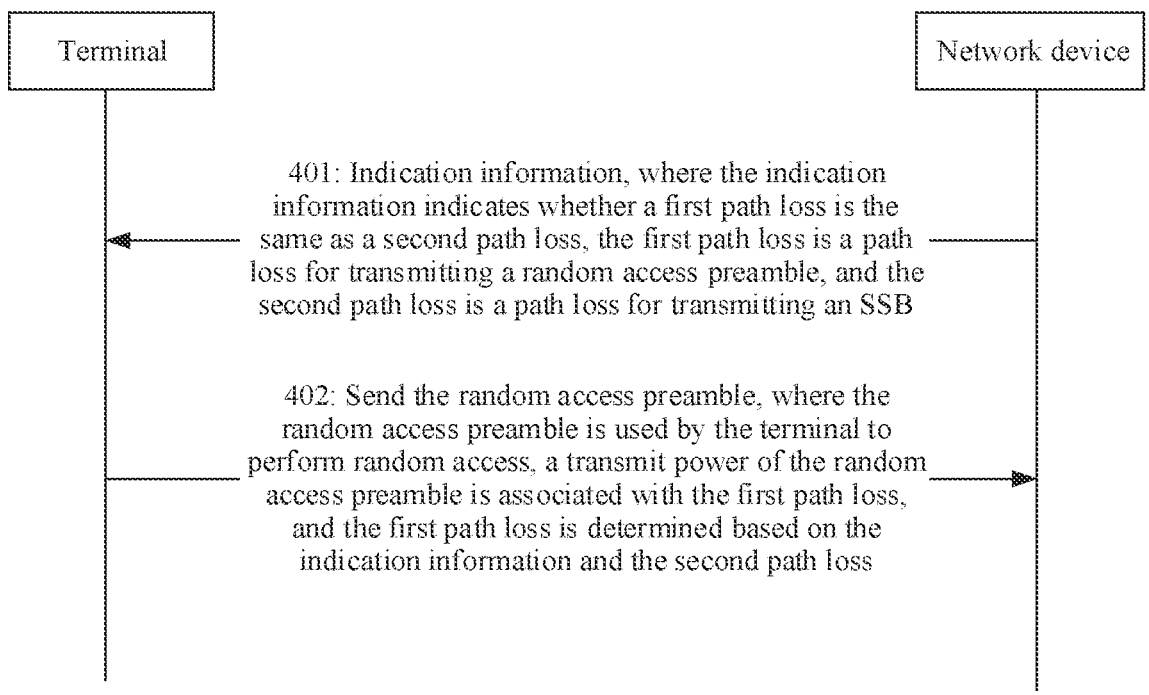
FIG. 4 is a schematic flowchart of a random access preamble transmission method according to an embodiment of this application.

FIG. 4 is a schematic flowchart of a random access preamble transmission method according to an embodiment of this application.

401: A terminal receives indication information, where the indication information indicates whether a first path loss is the same as a second path loss, the first path loss is a path loss for transmitting a random access preamble, and the second path loss is a path loss for transmitting an SSB. Correspondingly, the network device sends the indication information.

Specifically, the path loss may be understood as a power loss in a signal transmission process. The first path loss is for indicating a path loss for sending or receiving the random access preamble between the network device and the terminal. In embodiments of this application, the first path loss may be for indicating a path loss for sending the random access preamble by the terminal. The second path loss is for indicating a path loss for sending or receiving the SSB between the terminal and the network device. In embodiments of this application, the second path loss may be for indicating a path loss for receiving the SSB by the terminal.

It may be understood that the random access preamble may be the message 1 in FIG. 2, or may be the random access preamble in the message A in FIG. 3.

It may be further understood that the random access preamble may alternatively be replaced with a random access channel (RACH) or a channel state information reference signal (CSI-RS).

It may be further understood, that the path loss for transmitting the random access preamble is the same as the path loss for transmitting the SSB may be understood as: A transmit beam for sending the random access preamble is the same as a receive beam for receiving the SSB. Same beams may be understood as beams of a same type, for example, all the beams are wide beams or narrow beams. Alternatively, same beams may be understood as beams having a QCL relationship (for example, a QCL relationship in terms of an average gain or another QCL relationship). Alternatively, that beams are the same may be understood as: A transmit beam and a receive beam are a same beam, or a transmit beam and a receive beam have a special association relationship. For example, for receiving of two signals, at least one of parameters such as a delay spread, an average delay, a Doppler spread, a Doppler shift, an average gain, and a receive parameter is the same.

It may be further understood that the indication information may indicate whether a path loss for transmitting a specific type or any type of random access preamble is the same as the second path loss, or may indicate whether a path loss for transmitting a specific random access preamble is the same as the second path loss. For ease of description, in the following embodiments, whether a path loss for transmitting a specific random access preamble is the same as the second path loss is used as an example. However, this application is not limited thereto.

Optionally, the indication information includes a repetition field or a non-repetition (Not repetition) field, where the repetition field is for indicating that the first path loss is the same as the second path loss, and the non-repetition field is for indicating that the first path loss is different from the second path loss.

Specifically, the terminal may distinguish, based on different fields included in the indication information, between content indicated by the indication information.

Optionally, the indication information may alternatively include a repetition field and a non-repetition field. Whether the first path loss is the same as the second path loss is determined based on specific values of the repetition field and the non-repetition field.

Optionally, that the indication information indicates different content may be implemented through a value of a path loss difference, or may be implemented through whether there is a field for indicating a path loss difference.

Specifically, the network device may determine, depending on whether there is the field for indicating the path loss difference, the content indicated by the indication information. If there is the path loss difference field, the network device considers that there is a path loss difference between the path loss for transmitting the SSB and the path loss for transmitting the random access preamble. If there is no field for indicating the path loss difference, the network device considers that the path loss for transmitting the SSB is the same as the path loss for transmitting the random access preamble.

Alternatively, the network device may determine, based on the value of the path loss difference, the content indicated by the indication information. If the value of the path loss difference is 0, the network device considers that the path loss for transmitting the SSB is the same as the path loss for transmitting the random access preamble. If the value of the path loss difference is not 0, the network device considers that there is a path loss difference between the path loss for transmitting the SSB and the path loss for transmitting the random access preamble.

It may be understood, that a path loss for transmitting the SSB by the network device is the same as a path loss for transmitting the random access preamble by the network device may be understood as: A transmit beam for sending the SSB by the network device and a receive beam for receiving the random access preamble by the network device are a same beam. That there is a path loss difference between the path loss for transmitting the SSB by the network device and the path loss for transmitting the random access preamble by the network device may be understood as: The transmit beam for sending the SSB by the network device and the receive beam for receiving the random access preamble by the network device are different beams.

It may be further understood that the path loss difference between the path loss for transmitting the SSB by the network device and the path loss for transmitting the random access preamble by the network device may be configured by the network device. If the random access preamble is replaced with the CSI-RS, the path loss difference is a path loss difference between the path loss for transmitting the SSB by the network device and a path loss for transmitting the CSI-RS by the network device. For example, the network device may configure a CSI-RS by using system information. When configuring the CSI-RS, the network device may indicate a path loss difference or a beam gain difference between an SSB and the CSI-RS, in other words, configure the path loss difference between the SSB and the CSI-RS. A random access occasion may have an association relationship with the CSI-RS, that is, a signal sent on the random access occasion may have a same transmit beam or a same receive beam as the RS.

It may be further understood that a unit of the path loss difference in embodiments of this application may be 1 dB or 2 dB, and a value that can be configured is any value of 1, 2, 3, 4, 5, 6, 7, 8, 9, 10, 11, 12, 13, 14, 15, 16, 17, 18, 19, and 20 dB. In addition, the value may be positive or negative.

It may be understood that the terminal may send the random access preamble on the random access occasion. For example, there may be a mapping relationship between a random access preamble and a random access occasion. There may be a correspondence between the repetition field or the non-repetition field and the random access occasion.

402: The terminal sends the random access preamble, where the random access preamble is used by the terminal to perform random access, a transmit power of the random access preamble is associated with the first path loss, and the first path loss is determined based on the indication information and the second path loss. Correspondingly, the network device receives the indication information.

Specifically, that the transmit power is associated with the first path loss may be as follows: The terminal sets, based on the path loss (namely, the first path loss) for transmitting the random access preamble between the terminal and the network device, the transmit power for sending the random access preamble, so that a coverage distance of the random access preamble can be flexibly controlled, thereby improving communication efficiency.

In addition, the terminal may indicate, with reference to the indication information, whether the first path loss is the same as the second path loss, and determine the first path loss based on the second path loss. If the indication information indicates that the second path loss is the same as the first path loss, the terminal may determine the second path loss as the first path loss. For example, if a wide beam and a narrow beam may be used for signal transmission between the terminal and the network device, when the second path loss is the wide beam, the first path loss is the wide beam; or when the second path loss is the narrow beam, the first path loss is the narrow beam.

If the indication information indicates that the second path loss is different from the first path loss, the terminal may determine another path loss as the first path loss. In a scenario in Which a communication system includes two or more known path losses, if the second path loss is different from the first path loss, the terminal may select one of the plurality of known path losses as the first path loss. For example, if signal transmission between the terminal and the network device has only two forms: a wide beam and a narrow beam, when the second path loss is the wide beam, the first path loss is the narrow beam; or when the second path loss is the narrow beam, the first path loss is the wide beam.

It may be understood that the terminal may obtain a specific value of the second path loss in advance. A specific obtaining manner is not limited in embodiments of this application.

Optionally, when the indication information indicates that the first path loss is different from the second path loss, the indication information includes a path loss difference between the first path loss and the second path loss. In this way, the terminal may determine the first path loss based on the path loss difference and the second path loss.

Specifically, the indication information may include the path loss difference between the first path loss and the second path loss, so that the terminal may obtain the first path loss based on the path loss difference and the second path loss, and the network device may flexibly set a value of the second path loss. In this way, the terminal may have a plurality of transmit powers, and the terminal may flexibly control the coverage distance of the random access preamble, to further improve the communication efficiency.

For example, an implementation in which the terminal determines the first path loss based on the path loss difference and the second path loss is as follows:

$$P_{PRACH,b,f,c}(i) = \min\{P_{CMAX,f,c}(i), (P_{PRACH,target,f,c} + PL_{b,f,c} + G_{offset})\}.$$

$P_{PRACH,b,f,c}(i)$ represents a channel power used by the terminal to send the random access preamble, $P_{CMAX,f,c}(i)$ represents a maximum power for sending a signal by the terminal, $P_{PRACH,target,f,c}$ represents an expected receive power configured by the network device, $PL_{b,f,c}$ represents the second path loss, and $G_{offset}$ represents the path loss difference.

It may be understood that the maximum power for sending a signal by the terminal may be a capability of the terminal, or may be a maximum power that is for sending a signal and that is configured by the network device for the terminal.

Optionally, the SSB is associated with at least two random access occasions. In this case, step 402 may be specifically as follows: The terminal sends the random access preamble on at least one of the at least two random access occasions by using the transmit power.

Specifically, the SSB may be associated with one or more random access occasions, and the terminal may send the random access preamble on the random access occasion associated with the SSB. In addition, the network device may use an association relationship between an SSB and a random access occasion, so that different terminals send random access preambles on different random access occasions, to avoid interference between the different terminals in sending the random access preambles.

Figure 5:
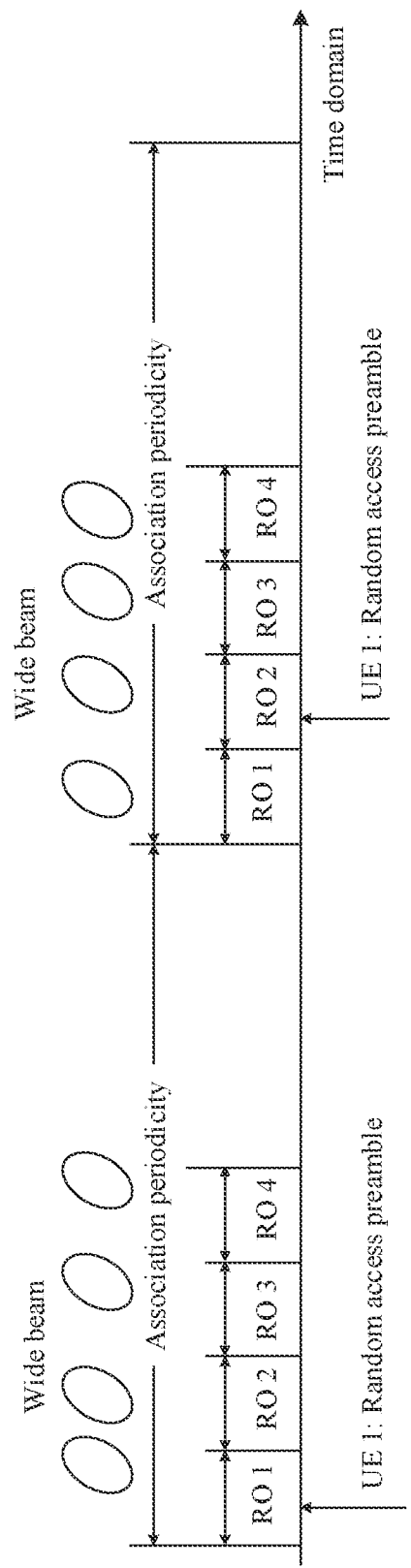
FIG. 5 is a schematic diagram of random access preamble transmission according to a specific embodiment of this application.

For example, as shown in FIG. 5, in an association periodicity, an SSB may be associated with four random access occasions: ail RO 1, an RO 2, an RO 3, and an RO 4. The terminal may send a random access preamble on some or all of the four random access occasions. In addition, the terminal may send random access preambles on different random access occasions in different association periodicities.

It should be noted that the terminal sends the random access preambles on more than one random access occasion among the random access occasions associated with the SSB, and a plurality of random access preambles sent on the more than one random access occasion may be the same, or may be random access preambles that have an association relationship. In other words, the terminal respectively sends same random access preambles on as many random access occasions as possible, to increase a probability of receiving the random access preamble by a base station. In addition, the network device receives the random access preambles that are sent by the terminal on the plurality of random access occasions and that are the same or have the association relationship, where the random access preambles may be used to identify the terminal. In other words, when determining that a plurality of received random access preambles are the same or have an association relationship, the network device may determine that the plurality of random access preambles are from a same terminal.

It may be understood that the terminal may alternatively send the random access preamble on a random access occasion that has no association relationship with the SSB. This is not limited in this application.

It may be further understood that the terminal may alternatively send another type of random access preamble on the random access occasion associated with the SSB, and the another type of random access preamble may be sent on one random access occasion, or may be sent on a plurality of random access occasions. This is not limited in this application. In other words, one random access preamble or a plurality of different random access preambles or one or more types of random access preambles may be sent on a same random access occasion.

Optionally, the random access occasion is associated with the SSB may be understood as: There is a QCL relationship between the SSB and the random access occasion.

Specifically, the terminal sends a random access preamble on a random access occasion that has a QCL relationship with a same SSB by using a same transmit beam or transmit beams having a same gain. Correspondingly, the network device receives the random access preamble on the random access occasion that has the QCL relationship with the same SSB by using a same receive beam or receive beams having a same gain.

It may be understood that an SSB may have a same QCL relationship or different QCL relationships with random access occasions in different random access occasion association periodicities.

For example, an SSB has QCL relationships with a random access occasion 1 (RO 1), an RO 2, an RO 3, and an RO 4 in a random access occasion association periodicity 1. The network device may respectively receive random access preambles by using a beam 1, a beam 2, a beam 3, and a beam 4. The SSB is associated with an RO 1, an RO 2, an RO 3, and an RO 4 in a random access occasion association periodicity 2. The network device may respectively receive random access preambles by using a beam 1, a beam 2, a beam 3, and a beam 4.

For another example, an SSB has QCL relationships with an RO 1, an RO 2, an RO 3, and an RO 4 in a random access occasion association periodicity 1. The network device respectively receives random access preambles by using a beam 1, a beam 2, a beam 3, and a beam 4. The SSB has QCL, relationships with an RO 1, an RO 2, an RO 3, and an RO 4 in a random access occasion association periodicity 2. The network device respectively receives random access preambles by using a beam 4, a beam 1, a beam 2, and a beam 3.

In other words, the network device may configure association relationships between SSB and ROs in two or more association periodicities. The network device may configure one association relationship for each RO or may configure one association relationship suitable for all the ROs. In addition, the association relationships between an SSB and ROs in two or more association periodicities may be the same or may be different. For example, configuration is performed in a cyclic offset manner, and one RO may be cyclically offset at an interval of one periodicity. To be specific, the network device receives the random access preambles on the RO 1, the RO 2, the RO 3, and the RO 4 in the random access occasion association periodicity 1 by sequentially using the beam 1, the beam 2, the beam 3, and the beam 4 respectively, and receives the random access preambles on the RO 1, the RO 2, the RO 3, and the RO 4 in the random access occasion association periodicity 2 by sequentially using, the beam 4, the beam 1, the beam 2, and the beam 3 respectively.

In an embodiment, the terminal may receive a random access response message associated with the random access preamble, where the random access response message is scrambled by using a first radio network temporary identifier (RNTI).

Specifically, the network device may receive one or more random access preambles, and teed back one or more random access response messages to the terminal. The one or more random access response messages may be scrambled by using the first RNTI. In other words, if there are a plurality of random access response messages, the plurality of random access response messages are scrambled by using a same RNTI.

It may be understood that the network device may feed back one random access response message for K random access preambles, where a value of K may be any one of 1, 2, 3, 4, 5, 6, 7, and 8.

It may be further understood that a scenario in which the network device feeds back only one random access response message may be as follows: The network device feeds back a random access response message upon detecting a random access preamble, and stops detecting another random access preamble.

For example, as shown in FIG. 5, the network device may receive one or more random access preambles on at least one random access occasion in an association periodicity, and send one or more random access response messages to the terminal in the association periodicity.

Optionally, the terminal may receive the random access response message associated with the random access preamble in a first window; where a start location of the first window is a start location of a random access response window associated with the $1^{st}$ random access occasion of at least two random access occasions, and an end location of the first window is an end location of a random access response window associated with the last random access occasion of the at least two random access occasions.

Figure 6:
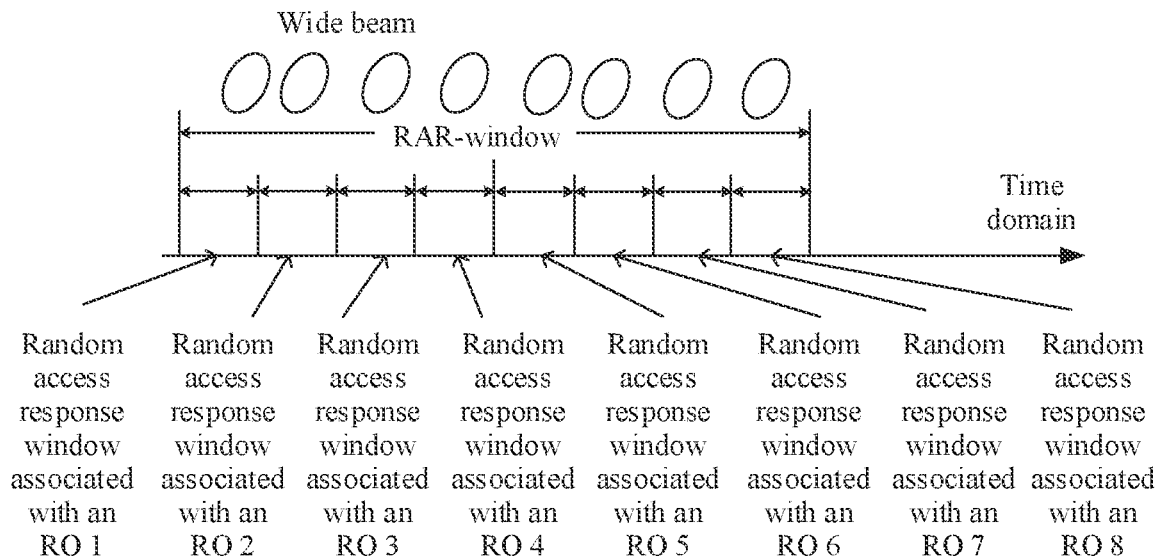
FIG. 6 is a schematic diagram of random access preamble transmission according to another specific embodiment of this application.

Specifically, the first window may be a random access response (RAR) window. In a scenario in which the terminal sends the random access preamble on the at least two random access occasions, the RAR-window may be flexibly set A random access response window associated with a random access occasion may be a receive window of a random access response message corresponding to a random access preamble sent on the random access occasion. For example, as shown in FIG. 6, if an SSB is associated with an RO 1 to an RO 8, and the terminal sends random access preambles on the RO 1 and the RO 8, an RAR-window may be set from a start moment of a random access response window corresponding to the RO 1 to an end moment of a random access response window corresponding to the RO 8. The terminal may receive a random access response message in the RAR-window.

It may be understood that the RAR-window may alternatively include only a random access response window associated with one RO.

It may be further understood that the RAR-window associated with one may be located after the RO.

It may be further understood that specific values of the at least two random access occasions each may be any one of 1, 2, 3, 4, 5, 6, 7, 8, 9, 10, 11, 12, 13, 14, 15, and 16.

In another embodiment, the terminal receives at least one random access response message, where the at least one random access response message each is scrambled by using an RNTI corresponding to a corresponding random access occasion, and each random access response message includes an identifier of a random access preamble corresponding to the random access response message. The terminal determines the random access response message for the random access preamble based on the identifier of the random access preamble in the random access response message.

Specifically, the network device may feed back a plurality of random access response messages to the terminal in one RAR-window. An RNTI for scrambling the plurality of random access response messages may be determined based on a random access occasion fir sending a random access preamble. In other words, there is a mapping relationship between a random access occasion and an RNTI, to be specific, there is a mapping relationship between an RNTI used by a network device to scramble a first random access response message and a random access occasion on which a first random access preamble corresponding to the first random access response message is located. As shown in FIG. 5, the RO 1 corresponds to an RNTI 1, the RO 2 corresponds to an RNTI 2, the RO 3 corresponds to an RNTI 3, and the RO 4 corresponds to an RNTI 4. In this case, the first random access response message corresponding to a random access preamble sent on the RO 1 is scrambled by using the RNTI 1.

In addition, the first random access response message corresponds to the first random access preamble, that is, the first random access response message is for responding to the first random access preamble. For example, the first random access response message may carry an identifier of the first random access preamble.

It may be understood that each random access response message includes an identifier that is of a random access preamble and that is for determining the response message, so that the terminal may determine, based on the identifier of the random access preamble, a specific random access preamble corresponding to the random access response message.

This application further shows a random access response message transmission method. A terminal may receive an indication about whether a path loss for transmitting an SSB is the same as a path loss for transmitting a random access response message. In this way, the terminal may determine, based on the path loss for transmitting the SSB, the path loss for transmitting the random access response message.

Figure 7:
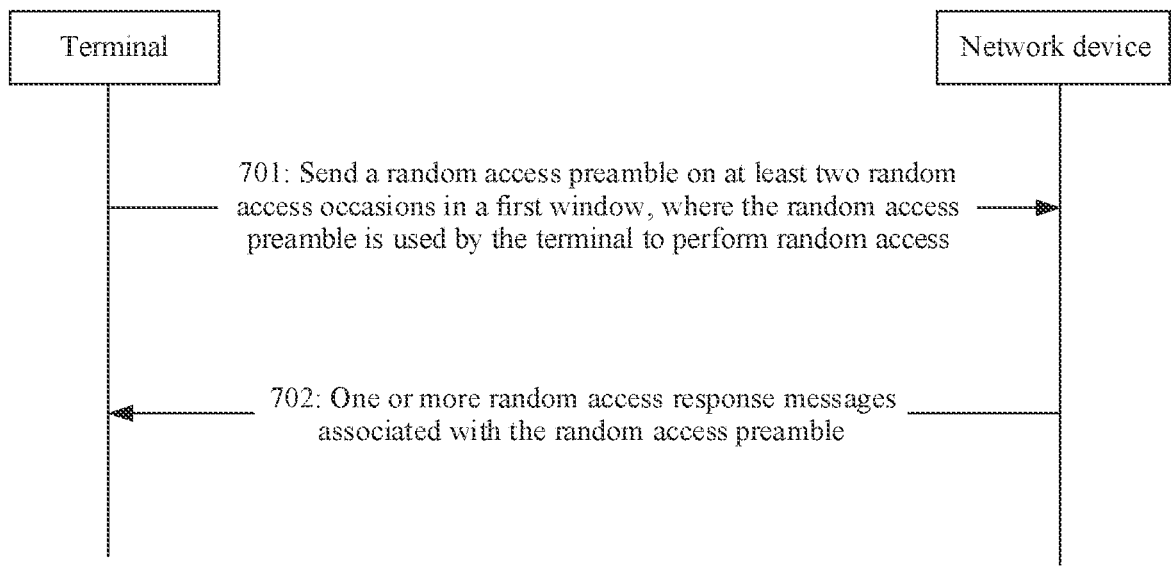
FIG. 7 is a schematic flowchart of a random access preamble transmission method according to another embodiment of this application.

FIG. 7 is a schematic flowchart of a random access preamble transmission method according to another embodiment of this application.

It should be noted that, unless otherwise specified, same terms in the embodiment described in FIG. 7 and the foregoing embodiment indicate same meanings. To avoid repetition, details are not described herein again.

701: A terminal sends a random access preamble on at least two random access occasions in a first window, where the random access preamble is used by the terminal to perform random access. Correspondingly, a network device receives the random access preamble on the at least two random access occasions.

Specifically, the terminal respectively sends the random access preamble on as many random access occasions as possible in one window, to increase a probability of receiving the random access preamble by a base station.

It may be understood that the first window may be an RO window, and the terminal sends the random access preamble on a random access occasion in the RO window, and waits for a random access response message corresponding to the random access preamble in an RAR-window. The first window includes at least two or more random access occasions. The random access occasions in the first window may be associated with a same SSB.

It may be further understood that the first window may be within an association periodicity. In other words, a start moment of the first window is later than or equal to a start moment of the association periodicity, and an end moment of the first window is earlier than or equal to an end moment of the association periodicity.

Optionally, the random access occasions in the first window are random access occasions associated with one SSB.

Specifically, the first window may include all or some random access occasions associated with the SSB.

Optionally, in order to be identified as a same terminal, the terminal may send same random access preambles in the first window, so that the network device may consider that the same random access preambles are received from the same terminal. The terminal may send random access preambles on all or some ROs of a corresponding SSB. The all or some ROs are all or some ROs associated with the SSB. In order for the random access preambles sent by a same terminal on different ROs to be identified, the terminal sends same random access preambles on a plurality of ROs, or random access preambles sent on a plurality of ROs have a specific association relationship. For example, there is an association relationship between a random access preamble 1 and a random access preamble 2. The association relationship may be defined by using a formula, or may be directly specified, the example, by using configuration information. The plurality of ROs may be random access occasions associated with one SSB.

702: The terminal receives one or more random access response messages for the random access preamble from the network device. Correspondingly, the network device sends the one or more random access response messages for the random access preamble to the terminal.

Specifically, the network device may select only one RAR-window in the plurality of ROs to send one RAR of the terminal. The terminal detects an RAR in a plurality of RAR-windows, and may stop detection after detecting a corresponding preamble index. RARs sent on the plurality of ROs may have a plurality of RA-RNTIs, or may use a same RA-RNTI. When there are a plurality of RA-RNTIs, the terminal detects the plurality of RA-RNTIs. Each RO may correspond to one RA-RNTI, or K ROs correspond to one RA-RNTI, where a value of K may be any one or more of 1, 2, 3, 4, 5, 6, 7, and 8.

It may be understood that the RA-RNTI may be generated based on a time-frequency resource location of the first RO, or may be generated based on a time-frequency resource location of any one of all ROs. Duration of RAR-windows in the plurality of ROs is the same. Each RO may correspond to one RAR-window, and the terminal may detect a corresponding RA-RNTI in the plurality of RAR-windows. Alternatively, an RAR-window is redefined, that is, random access preambles transmitted on M ROs correspond to a same RAR-window. Therefore, a start location of the RAR-window may be a start location of an RAR-window of the first RO. In addition, duration of the RAR-window may be from the start location of the RAR-window of the first RO to an end location of an RAR-window of the last RO. A gap may be removed in the duration, and the interval indicates a time range that is not covered by any RAR-window of each RO. A value of M may be any one or more of 1, 2, 3, 4, 5, 6, 7, 8, 9, 10, 11, 12, 13, 14, 15, and 16. The value of K may be the same as the value of M. For example, both values represent a quantity of random access occasions associated with one SSB.

Optionally, the network device may receive one or more random access preambles, and feed back one or more random access responses message to the terminal. The one or more random access response messages may be scrambled by using a first RNTI. In other words, if there are a plurality of random access response messages, the plurality of random access response messages are scrambled by using a same RNTI, to reduce signaling overheads for scrambling the random access response messages.

Optionally, the network device may feed back a plurality of random access response messages to the terminal in one RAR-window. An RNTI for scrambling the plurality of random access response messages may be determined based on a random access occasion for sending a random access preamble. In other words, there is a mapping relationship between a random access occasion and an RNTI, to be specific, there is a mapping relationship between an RNTI used by a network device to scramble a first random access response message and a random access occasion on which a first random access preamble corresponding to the first random access response message is located. In this way, the terminal may identify random access response messages corresponding to different random access preambles, to improve flexibility of random access preamble transmission.

Optionally, the terminal may receive the random access response message associated with the random access preamble in a first RAR-window, where a start location of the first RAR-window is a start location of a random access response window associated with the $1^{st}$ random access occasion of the at least two random access occasions, and an end location of the first RAR-window is an end location of a random access response window associated with the last random access occasion of the at least two random access occasions.

Specifically, the first RAR-window may be a random access response (RAR) window. In a scenario in which the terminal sends the random access preamble on the at least two random access occasions, the RAR-window may be flexibly set. A random access response window associated with a random access occasion may be a receive window of a random access response message corresponding to a random access preamble sent on the random access occasion. For example, as shown in FIG. 6, if an SSB is associated with an RO 1 to an RO 8, and the terminal sends random access preambles on the RO 1 and the RO 8, a first RAR-window may be set from a start moment of a random access response window corresponding to the RO 1 to an end moment of a random access response window corresponding to the RO 8. The terminal may receive a random access response message in the RAR-window.

It may be understood that the first RAR-window may alternatively include only a random access response window associated with one RO.

It may be further understood that specific values of the at least two random access occasions each may be any one of 1, 2, 3, 4, 5, 6, 7, 8, 9, 10, 11, 12, 13, 14, 15, and 16.

Embodiments described in this specification may be independent solutions, or may be combined based on internal logic. All these solutions fall within the protection scope of this application.

It may be understood that, in the foregoing method embodiments, the methods and operations that are implemented by the terminal may alternatively be implemented by a component (for example, a chip or a circuit) that may be used in the terminal, and the methods and the operations that are implemented by the network device may alternatively be implemented by a component (for example, a chip or a circuit) that may be used in the access network device.

The foregoing mainly describes the solutions provided in embodiments of this application from a perspective of interaction. It may be understood that, to implement the foregoing functions, each network element, such as a transmit end device or a receive end device, includes a corresponding hardware structure and/or software module for performing each function. A person skilled in the art may be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, functional module division may be performed on the transmit end device or the receive end device based on the foregoing method examples. For example, various functional modules may be divided based on corresponding functions, or two or more functions may be integrated into one processing module. The integrated module may be implemented in a form of hardware, or may be implemented in a form of a software functional module. It should be noted that, in embodiments of this application, division into the modules is an example, and is merely a logical functional division. In actual implementation, another division manner may be used. An example in which each functional module is obtained through division based on each corresponding function is used below for description.

It should be understood that specific examples in embodiments of this application are merely intended to help a person skilled in the art better understand embodiments of this application, but are not intended to limit the scope of embodiments of this application.

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

The methods provided in embodiments of this application are described above in detail with reference to FIG. 4 to FIG. 7. Apparatuses provided in embodiments of this application are described below in detail with reference to FIG. 8 to FIG. 15. It should be understood that descriptions of the apparatus embodiments correspond to the descriptions of the method embodiments. Therefore, for content that is not described in detail, refer to the foregoing method embodiments. For brevity, details are not described herein again.

Figure 8:
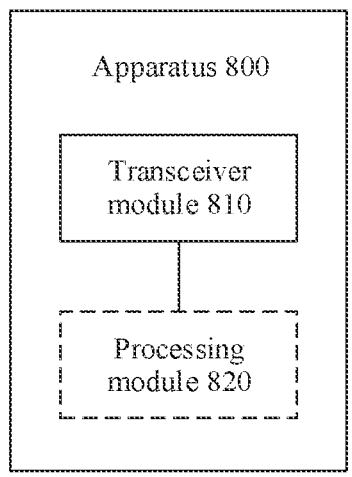
FIG. 8 is a schematic block diagram of a random access preamble transmission apparatus according to an embodiment of this application.

FIG. 8 is a schematic block diagram of a random access preamble transmission apparatus 800 according to an embodiment of this application.

It should be understood that the apparatus 800 may correspond to each terminal shown in FIG. 1 or a chip in the terminal, and the terminal in the embodiment shown in FIG. 4 or a chip in the terminal, and may have any function of the terminal in the method embodiment shown in FIG. 4. The apparatus 800 includes a transceiver module 810. The transceiver module 810 may specifically include a receiving module and a sending module.

The receiving module is configured to receive indication information, where the indication information indicates whether a first path loss is the same as a second path loss, the first path loss is a path loss for transmitting a random access preamble, and the second path loss is a path loss for transmitting a synchronization signal block (SSB).

The sending module is configured to send the random access preamble, where the random access preamble is used by a terminal to perform random access, a transmit power of the random access preamble is associated with the first path loss, and the first path loss is determined based on the indication information and the second path loss.

Optionally, the indication information includes a repetition field or a non-repetition field, the repetition field is for indicating that the first path loss is the same as the second path loss, and the non-repetition field is for indicating that the first path loss is different from the second path loss.

Optionally, when the indication information indicates that the first path loss is different from the second path loss, the indication information further includes a path loss difference between the first path loss and the second path loss, and the first path loss is determined based on the path loss difference and the second path loss.

Specifically, the apparatus 800 further includes a processing module 820. The processing module 820 is configured to determine the first path loss based on the path loss difference and the second path loss.

Optionally, the SSB is associated with at least two random access occasions, and the sending module is specifically configured to send the random access preamble on at least one of the at least two random access occasions.

Optionally, the receiving module is further configured to receive one or more random access response messages associated with the random access preamble, where the one or more random access response messages are scrambled by using a first radio network temporary identifier RNTI.

Optionally, the receiving module is further configured to receive the random access response message for the random access preamble in a first window, where a start location of the first window is a start location of a random access response window associated with the $1^{st}$ random access occasion of the at least two random access occasions, and an end location of the first window is an end location of a random access response window associated with the last random access occasion of the at least two random access occasions.

Optionally, the receiving module is further configured to receive one or more random access response messages associated with the random access preamble, where a first random access response message of the one or more random access response messages is scrambled by using an RNTI corresponding to a first random access occasion of the at least two random access occasions, and the first random access response message is for responding to the random access preamble transmitted on the first random access occasion.

For more detailed descriptions of the transceiver module 810 and the processing module 820, refer to the related descriptions in the foregoing method embodiments. Details are not described herein again.

Figure 9:
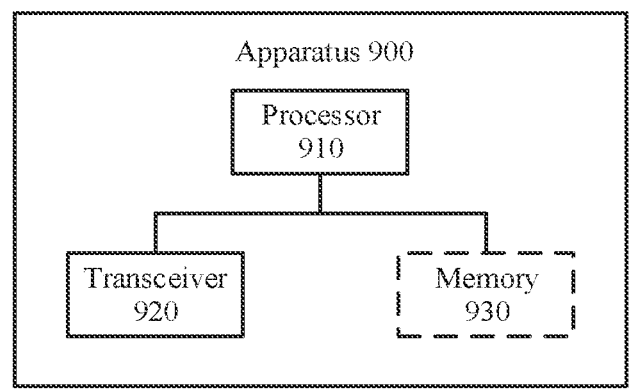
FIG. 9 is a schematic diagram of a structure of a random access preamble transmission apparatus according to an embodiment of this application.

FIG. 9 shows a communication apparatus 900 according to an embodiment of this application. The apparatus 900 may be the terminal described in FIG. 3. The apparatus may use a hardware architecture shown in FIG. 9. The apparatus may include a processor 910 and a transceiver 920. Optionally, the apparatus may further include a memory 930. The processor 910, the transceiver 920, and the memory 930 communicate with each other through an internal connection path. A related function implemented by the processing module 820 in FIG. 8 may be implemented by the processor 910, and a related function implemented by the transceiver module 810 may be implemented by the processor 910 by controlling the transceiver 920.

Optionally, the processor 910 may be a general-purpose central processing unit (CPU), a microprocessor, an application-specific integrated circuit (ASIC), a dedicated processor, or one or more integrated circuits configured to perform the technical solutions in embodiments of this application. Alternatively, the processor may be one or more devices, circuits, and/or processing cores configured to process data (for example, computer program instructions). For example, the processor may be a baseband processor or a central processing unit. The baseband processor may be configured to process a communication protocol and communication data. The central processing unit may be configured to: control the communication apparatus (for example, a base station, a terminal, or a chip), execute a software program, and process data of the software program.

Optionally, the processor 910 may include one or more processors, for example, include one or more central processing units (CPUs). When the processor is one CPU, the CPU may be a single-core CPU, or may be a multi-core CPU.

The transceiver 920 is configured to send and receive data and/or a signal, and receive data and/or a signal. The transceiver may include a transmitter and a receiver. The transmitter is configured to send data and/or a signal, and the receiver is configured to receive data and/or a signal.

The memory 930 includes but is not limited to a random access memory (RAM), a read-only memory (ROM), an erasable programmable memory (EPROM), and a compact disc read-only memory (CD-ROM). The memory 930 is configured to store related instructions and data.

The memory 930 is configured to store program code and data of the terminal, and may be a separate component or integrated into the processor 910.

Specifically, the processor 910 is configured to control the transceiver to perform information transmission with the terminal. For details, refer to the descriptions in the method embodiments. Details are not described herein again.

During specific implementation, in an embodiment, the apparatus 900 may further include an output device and an input device. The output device communicates with the processor 910, and may display information in a plurality of manners. For example, the output device may be a liquid crystal display (LCD), a light emitting diode (LED) display device, a cathode ray tube (CRT) display device, or a projector. The input device communicates with the processor 910, and may receive an input from a user in a plurality of manners. For example, the input device may be a mouse, a keyboard, a touchscreen device, or a sensor device.

It may be understood that FIG. 9 only shows a simplified design of the communication apparatus. During actual application, the apparatus may further include other necessary components, including but not limited to any quantity of transceivers, processors, controllers, memories, and the like, and all terminals that can implement this application shall fall within the protection scope of this application.

In a possible design, the apparatus 900 may be a chip, for example, a communication chip that can be used in the terminal, and is configured to implement a related function of the processor 910 in the terminal. The chip may be a field programmable gate array, a dedicated integrated chip, a system chip, a central processing unit, a network processor, a digital signal processing circuit, or a microcontroller that implements the related function, or may be a programmable controller or another integrated chip. Optionally, the chip may include one or more memories, configured to store program code. When the code is executed, the processor is enabled to implement a corresponding function.

An embodiment of this application further provides an apparatus. The apparatus may be a terminal or a circuit. The apparatus may be configured to perform an action performed by the terminal in the foregoing method embodiments.

Figure 10:
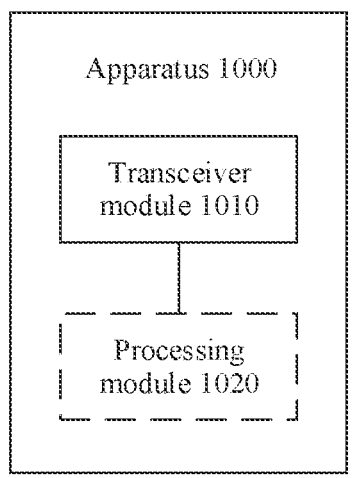
FIG. 10 is a schematic block diagram of a random access preamble transmission apparatus according to another embodiment of this application.

FIG. 10 is a schematic block diagram of a random access preamble transmission apparatus 1000 according to an embodiment of this application.

It should be understood that the apparatus 1000 may correspond to the network device shown in FIG. 1 or a chip in the network device, or the network device in the embodiment shown in FIG. 4 or a chip in the network device, and may have any function of the network device in the method. The apparatus 1000 includes a transceiver module 1010. The transceiver module includes a receiving module and a sending module.

The sending module is configured to send indication information, where the indication information indicates whether a first path loss is the same as a second path loss, the first path loss is a path loss for transmitting a random access preamble, and the second path loss is a path loss for transmitting a synchronization signal block (SSB).

The receiving module is configured to receive the random access preamble sent by a terminal, where the random access preamble is used by the terminal to perform random access, a transmit power of the random access preamble is associated with the first path loss, and the first path loss is determined based on the indication information and the second path loss.

Optionally, the apparatus 1000 may further include a processing module 1020. The processing module may be configured to determine the indication information.

Optionally, the indication information includes a repetition field or a non-repetition field, the repetition field is for indicating that the first path loss is the same as the second path loss, and the non-repetition field is for indicating that the first path loss is different from the second path loss.

Optionally, when the indication information indicates that the first path loss is different from the second path loss, the indication information further includes a path loss difference between the first path loss and the second path loss.

Optionally, the SSB is associated with at least two random access occasions, and the receiving module is specifically configured to:

receive the random access preamble on at least one of the at least two random access occasions.

Optionally, the sending module is further configured to send one or more random access response messages associated with the random access preamble, where the one or more random access response messages are scrambled by using a first RNTI.

Optionally, the sending module is further configured to send one or more random access response messages associated with the random access preamble, where a first random access response message of the one or more random access response messages is scrambled by using an RNTI corresponding to a first random access occasion of the at least two random access occasions, and the first random access response message is for responding to the random access preamble transmitted on the first random access occasion.

For more detailed descriptions of the transceiver module 1010 and the processing module 1020, refer to the related descriptions in the foregoing method embodiments. Details are not described herein again.

Figure 11:
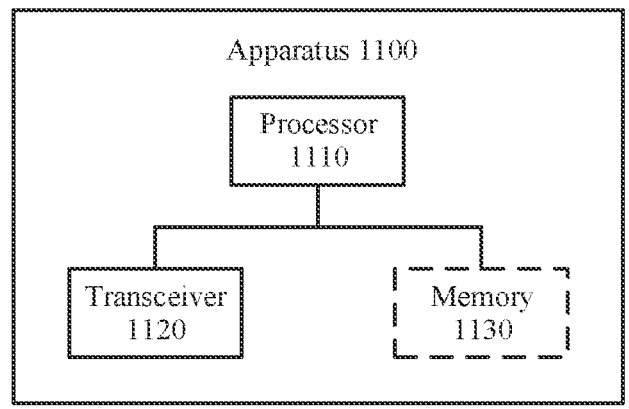
FIG. 11 is a schematic diagram of a structure of a random access preamble transmission apparatus according to another embodiment of this application.

FIG. 11 shows a communication apparatus 1100 according to an embodiment of this application. The apparatus 1100 may be the network device described in FIG. 4. The apparatus may use a hardware architecture shown in FIG. 11. The apparatus may include a processor 1110 and a transceiver 1120. Optionally, the apparatus may further include a memory 1130. The processor 1110, the transceiver 1120, and the memory 1130 communicate with each other through an internal connection path. A related function implemented by the processing module 1020 in FIG. 10 may be implemented by the processor 1110, and a related function implemented by the transceiver module 1010 may be implemented by the processor 1110 by controlling the transceiver 1120.

Optionally, the processor 1110 may be a general-purpose central processing unit (CPU), a microprocessor, an application-specific integrated circuit (ASIC), a dedicated processor, or one or more integrated circuits configured to perform the technical solutions in embodiments of this application. Alternatively, the processor may be one or more devices, circuits, and/or processing cores configured to process data (for example, computer program instructions). For example, the processor may be a baseband processor or a central processing unit. The baseband processor may be configured to process a communication protocol and communication data. The central processing unit may be configured to: control the communication apparatus (for example, a base station, a terminal, or a chip), execute a software program, and process data of the software program.

Optionally, the processor 1110 may include one or more processors, for example, include one or more central processing units (CPUs). When the processor is one CPU, the CPU may be a single-core CPU, or may be a multi-core CPU.

The transceiver 1120 is configured to send and receive data and/or a signal, and receive data and; or a signal. The transceiver may include a transmitter and a receiver. The transmitter is configured to send data and/or a signal, and the receiver is configured to receive data and; or a signal.

The memory 1130 includes but is not limited to a random access memory (RAM), a read-only memory (ROM), an erasable programmable memory (EPROM), and a compact disc read-only memory (CD-ROM). The memory 1130 is configured to store related instructions and data.

The memory 1130 is configured to store program code and data of the network device, and may be a separate component or integrated into the processor 1110.

Specifically, the processor 1110 is configured to control the transceiver to perform information transmission with the terminal. For details, refer to the descriptions in the method embodiments. Details are not described herein again.

During specific implementation, in an embodiment, the apparatus 1100 may further include an output device and an input device. The output device communicates with the processor 1110, and may display information in a plurality of manners. For example, the output device may be a liquid crystal display (LCD), a light emitting diode (LED) display device, a cathode ray tube (CRT) display device, or a projector. The input device communicates with the processor 1110, and may receive an input from a user in a plurality of manners. For example, the input device may be a mouse, a keyboard, a touchscreen device, or a sensor device.

It may be understood that FIG. 11 only shows a simplified design of the communication apparatus. During actual application, the apparatus may further include other necessary components, including but not limited to any quantity of transceivers, processors, controllers, memories, and the like, and all network devices that can implement this application shall fall within the protection scope of this application.

In a possible design, the apparatus 1100 may be a chip, for example, a communication chip that can be used in the network device, and is configured to implement a related function of the processor 1110 in the network device. The chip may be a field programmable gate array, a dedicated integrated chip, a system chip, a central processing unit, a network processor, a digital signal processing circuit, or a microcontroller that implements the related function, or may be a programmable controller or another integrated chip. Optionally, the chip may include one or more memories, configured to store program code. When the code is executed, the processor is enabled to implement a corresponding function.

An embodiment of this application further provides an apparatus. The apparatus may be a network device or a circuit. The apparatus may be configured to perform an action performed by the network device in the foregoing method embodiments.

Figure 12:
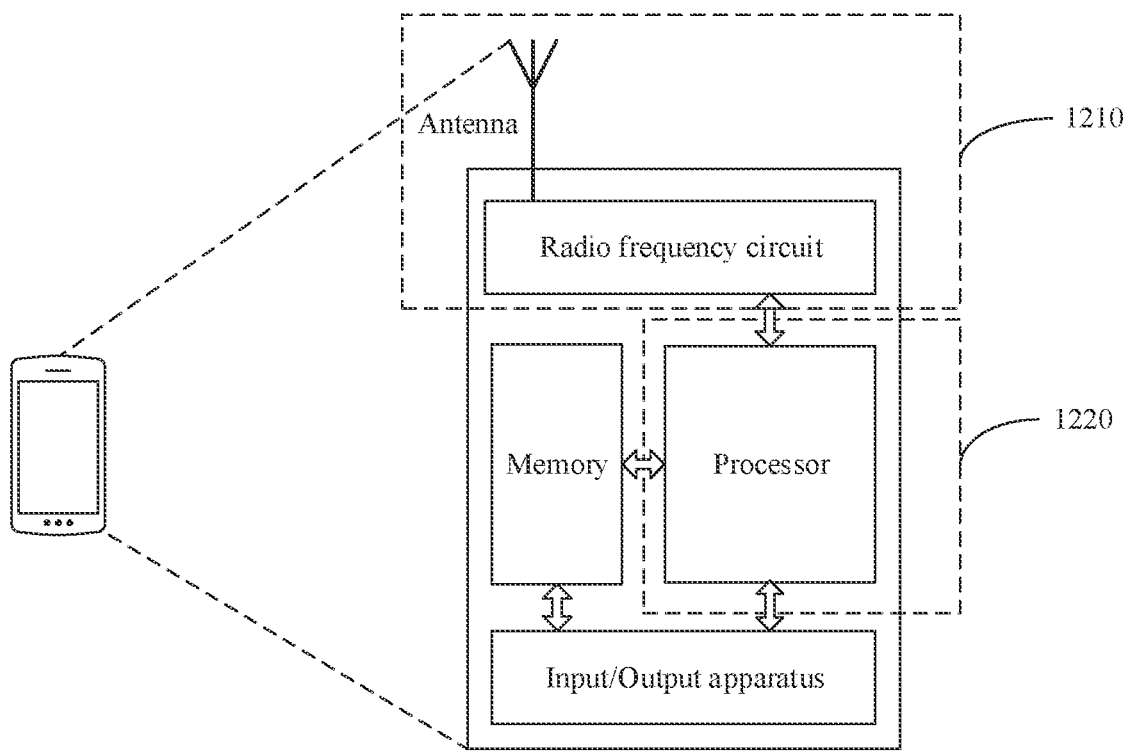
FIG. 12 is a schematic diagram of a random access preamble transmission apparatus according to another specific embodiment of this application.

Optionally, when the apparatus in this embodiment is a terminal, FIG. 12 is a schematic diagram of a simplified structure of a terminal. For ease of understanding and illustration, in FIG. 12, a mobile phone is used as an example of the terminal. As shown in FIG. 12, the terminal includes a processor, a memory, a radio frequency circuit, an antenna, and an input/output apparatus. The processor is mainly configured to: process a communication protocol and communication data, control the terminal, execute a software program, process data of the software program, and the like. The memory is mainly configured to store the software program and the data. The radio frequency circuit is mainly configured to perform conversion between a baseband signal and a radio frequency signal, and process the radio frequency signal. The antenna is mainly configured to receive and send a radio frequency signal in a form of an electromagnetic wave. The input/output apparatus such as a touchscreen, a display screen, or a keyboard is mainly configured to receive data entered by a user, and output data to a user. It should be noted that some types of terminals may have no input/output apparatus.

When needing to send data, after performing baseband processing on the to-be-sent data, the processor outputs a baseband signal to the radio frequency circuit. The radio frequency circuit performs radio frequency processing on the baseband signal, and then sends a radio frequency signal to the outside in a form of an electromagnetic wave through the antenna. When data is sent to the terminal, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 12 shows only one memory and one processor. In an actual terminal product, there may be one or more processors and one or more memories. The memory may also be referred to as a storage medium, a storage device, or the like. The memory may be independent of the processor, or may be integrated with the processor. This is not limited in embodiments of this application.

In this embodiment of this application, the antenna having receiving and sending functions and the radio frequency circuit may be considered as a transceiver unit of the terminal, and the processor having a processing function is considered as a processing unit of the terminal. As shown in FIG. 12, the terminal includes a transceiver unit 1210 and a processing unit 1220. The transceiver unit may also be referred to as a transceiver, a transceiver apparatus or the like. The processing unit may also be referred to as a processor, a processing board, a processing module, a processing apparatus, or the like. Optionally, a component that is in the transceiver unit 1210 and that is configured to implement a receiving function may be considered as a receiving unit, and a component that is in the transceiver unit 1210 and that is configured to implement a sending function may be considered as a sending unit. In other words, the transceiver unit 1210 includes the receiving unit and the sending unit. The transceiver unit sometimes may also be referred to as a transceiver, a transceiver circuit, or the like. The receiving unit sometimes may also be referred to as a receiver, a receiver circuit, or the like. The sending unit sometimes may also be referred to as a transmitter, a transmitting circuit, or the like.

It should be understood that the transceiver unit 1210 is configured to perform a sending operation and a receiving operation on the terminal side in the foregoing method embodiments, and the processing unit 1220 is configured to perform an operation other than the receiving/sending operation of the terminal in the foregoing method embodiments.

For example, in an implementation, the processing unit 1220 is configured to perform the processing steps on the terminal side in FIG. 4. The transceiver unit 1210 is configured to perform the sending operation and the receiving operation in step 401 and step 402 in FIG. 4, and/or the transceiver unit 1210 is further configured to perform other sending and receiving steps on the terminal side in embodiments of this application.

When the apparatus is a chip, the chip includes a transceiver unit and a processing unit. The transceiver unit may be an input/output circuit or a communication interface. The processing unit is a processor, a microprocessor, or an integrated circuit that is integrated on the chip.

Figure 13:
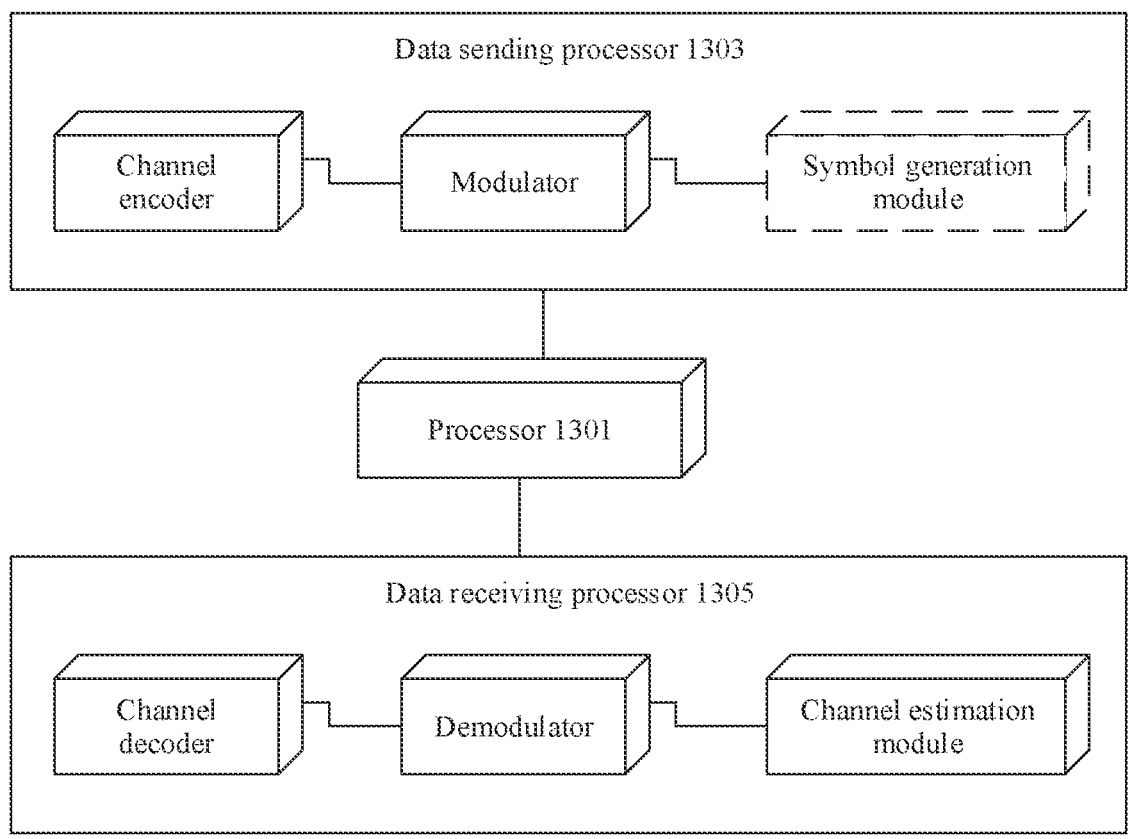
FIG. 13 is a schematic diagram of a random access preamble transmission apparatus according to another specific embodiment of this application.

Optionally, when the apparatus is a terminal, reference may further be made to a device shown in FIG. 13. In an example, the device may implement a function similar to that of the processor 910 in FIG. 9. In FIG. 13, the device includes a processor 1301, a data sending processor 1303, and a data receiving processor 1305. The processing module 820 in the foregoing embodiment shown in FIG. 8 may be the processor 1301 in FIG. 13, and completes a corresponding function. The transceiver module 810 in the foregoing embodiment shown in FIG. 8 may be the data sending processor 1303 and the data receiving processor 1305 in FIG. 13. Although FIG. 13 shows a channel encoder and a channel decoder, it may be understood that these modules are merely examples, and do not constitute any limitation on this embodiment.

Figure 14:
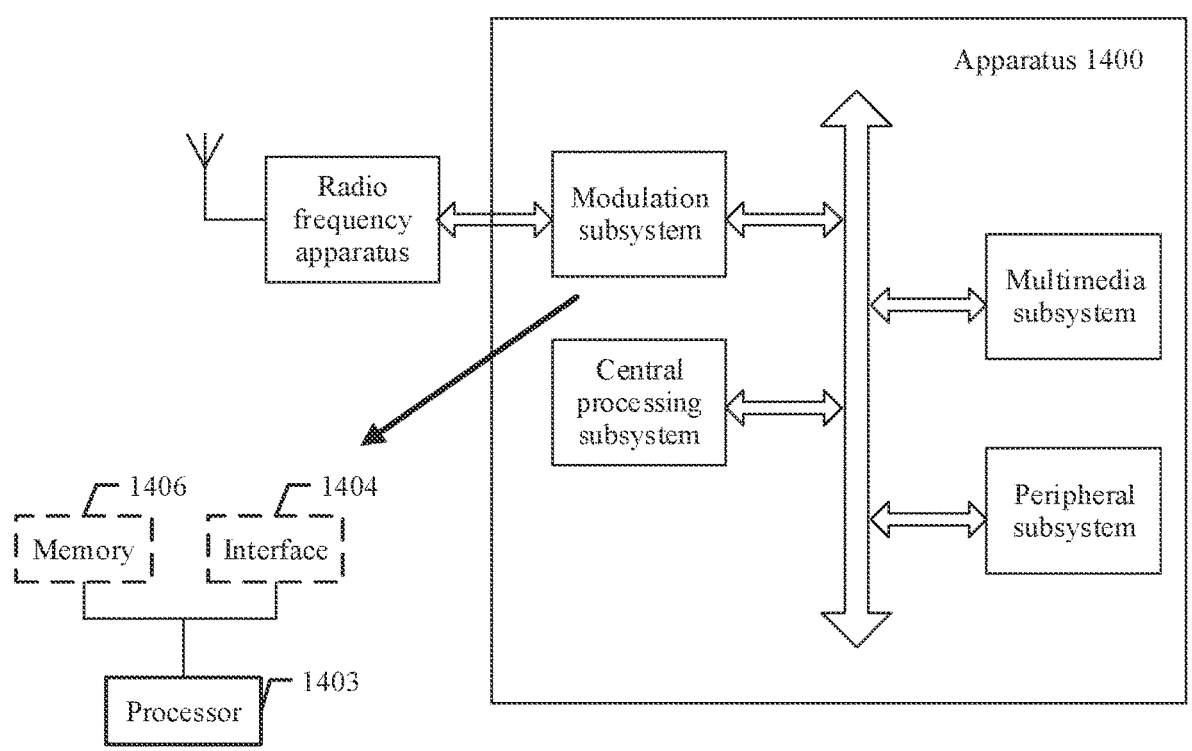
FIG. 14 is a schematic diagram of a random access preamble transmission apparatus according to another specific embodiment of this application.

FIG. 14 shows another form of this embodiment. A processing apparatus 1400 includes modules such as a modulation subsystem, a central processing subsystem, and a peripheral subsystem. A communication device in this embodiment may be used as the modulation subsystem in the processing apparatus 1400. Specifically, the modulation subsystem may include a processor 1403 and an interface 1404. The processor 1403 implements a function of the processing module 820, and the interface 1404 implements a function of the transceiver module 810. In another variation, the modulation subsystem includes a memory 1406, the processor 1403, and a program that is stored in the memory and that is executable in the processor. When the program is executed by the processor, the methods in embodiments are implemented. It should be noted that the memory 1406 may be non-volatile or volatile. The memory 1406 may be located inside the modulation subsystem, or may be located in the processing apparatus 1400, provided that the memory 1406 can be connected to the processor 1403.

Figure 15:
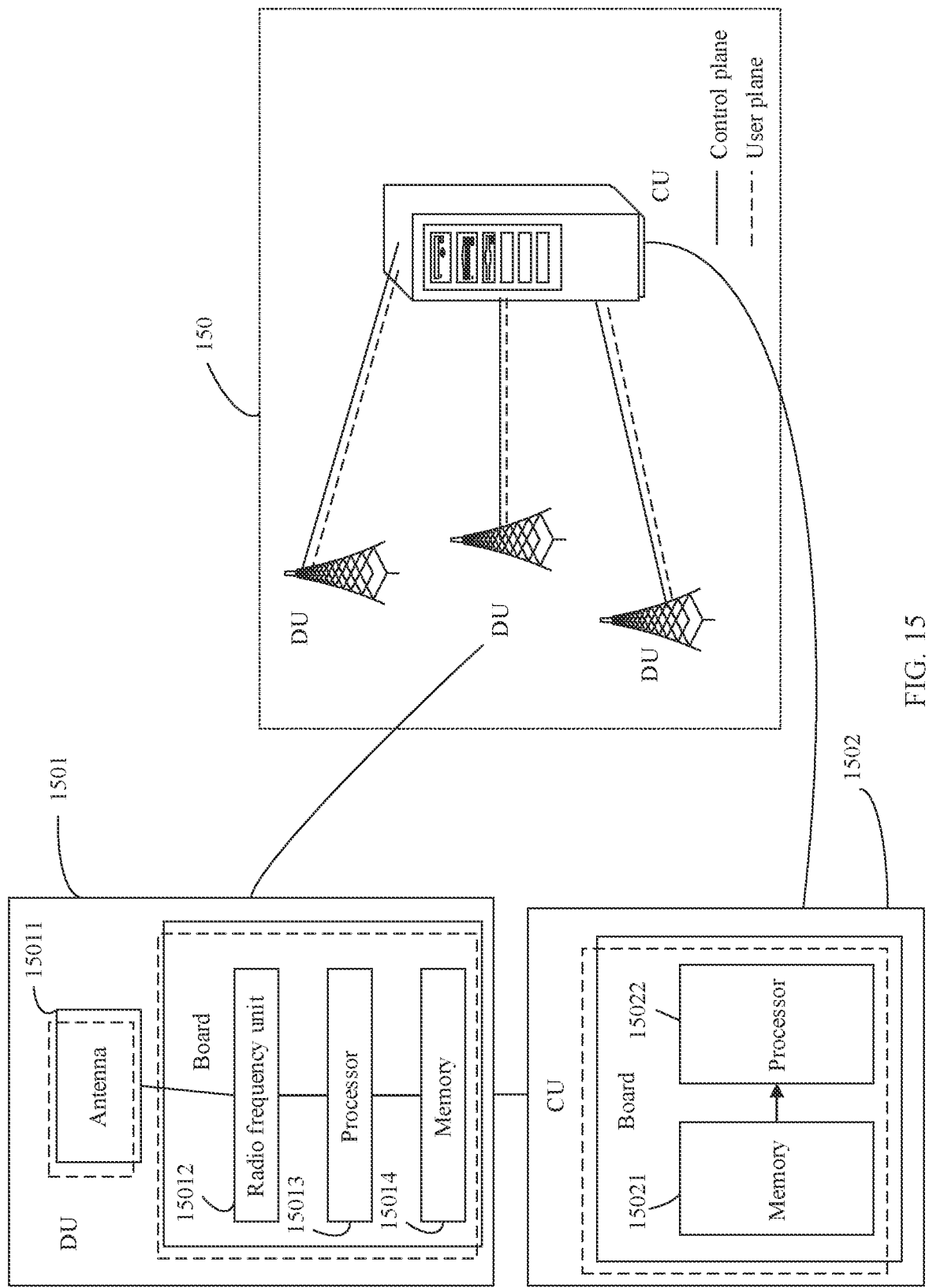
FIG. 15 is a schematic diagram of a random access preamble transmission apparatus according to another specific embodiment of this application.

When the apparatus in this embodiment is a network device, the network device may be shown in FIG. 15. For example, the apparatus 150 is a base station. The base station may be used in the system shown in FIG. 1, to perform a function of the network device in the foregoing method embodiments. The base station 150 may include one or more DUs 1501 and one or more CUs 1502. The CU 1502 may communicate with a next generation core (NG core, NC) network. The DU 1501 may include at least one antenna 15011, at least one radio frequency unit 15012, at least one processor 15013, and at least one memory 15014. The DU 1501 is mainly configured to receive and send a radio frequency signal, convert a radio frequency signal and a baseband signal, and perform some baseband processing. The CU 1502 may include at least one processor 15022 and at least one memory 15021. The CU 1502 and the DU 1501 may communicate through an interface. A control plane interface may be Fs-C, for example, F1-C, and a user plane interface may be Fs-U, for example, F1-U.

The CU 1502 is mainly configured to perform baseband processing, control the base station, and the like. The DU 1501 and the CU 1502 may be physically disposed together, or may be physically separated, that is, a distributed base station. The CU 1502 is a control center of the base station, may also be referred to as a processing unit, and is mainly configured to complete a baseband processing function. For example, the CU 1502 may be configured to control the base station to perform an operation procedure related to the network device in the foregoing method embodiments.

Specifically, baseband processing on the CU and the DU may be divided based on protocol layers of a wireless network. For example, functions of a packet data convergence protocol (PDCP) layer and a protocol layer above the PDCP layer are set in the CU. Functions of protocol layers below the PDCP layer, such as a radio link control (RLC) layer and a medium access control (MAC) layer, are set in the DU. For another example, the CU implements functions of a radio resource control (RRC) layer and a packet data convergence protocol (PDCP) layer. The DU implements functions of a radio link control (RLC) layer, a MAC layer, and a physical (PRY) layer.

In addition, optionally, the base station 150 may include one or more radio frequency units (RUs), one or more DUs, and one or more CUs. The DU may include at least one processor 15013 and at least one memory 15014, the RU may include at least one antenna 15011 and at least one radio frequency unit 15012, and the CU may include at least one processor 15022 and at least one memory 15021.

For example, in an implementation, the processor 15013 is configured to perform the processing steps on the network device side in FIG. 4. The radio frequency unit 15012 is configured to perform the receiving and sending operations in step 401 and step 402 in FIG. 4.

In an example, the CU 1502 may include one or more boards, and a plurality of boards may jointly support a radio access network (for example, a 5G network) of a single access standard, or may separately support radio access networks (such as an LTE network, a 5G network, or another network) of different access standards. The memory 15021 and the processor 15022 may serve the one or more boards. In other words, a memory and a processor may be disposed on each board. Alternatively, a plurality of boards may share a same memory and a same processor. In addition, a necessary circuit may be further disposed on each board. The DU 1501 may include one or more boards, and a plurality of boards may jointly support a radio access network (for example, a 5G network) of a single access standard, or may separately support radio access networks (such as an LTE network, a 5G network, or another network) of different access standards. The memory 15014 and the processor 15013 may serve the one or more boards. In other words, a memory and a processor may be disposed on each board. Alternatively, a plurality of boards may share a same memory and a same processor. In addition, a necessary circuit may be further disposed on each board.

All or some of the foregoing embodiments may be implemented by using software, hardware, firmware, or any combination thereof. When the software is used to implement embodiments, embodiments may be implemented completely or partially in a form of a computer program product. The computer program product includes one or more computer instructions. When the computer instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

It should be understood that the processor may be an integrated circuit chip and has a signal processing capability. In an implementation process, steps in the foregoing method embodiments can be completed by using a hardware integrated logical circuit in the processor or by using instructions in a form of software. The foregoing processor may be a general-purpose processor, a digital signal processor (DSP), an application-specific integrated circuit (ASIC), a field programmable gate array (FPGA), another programmable logic device, a discrete gate or transistor logic device, or a discrete hardware component. The processor may implement or perform the methods, the steps, and the logical block diagrams that are disclosed in embodiments of this application. The general-purpose processor may be a microprocessor, or the processor may be any conventional processor or the like. The steps of the methods disclosed with reference to embodiments of this application may be directly executed and completed by using a hardware decoding processor, or may be executed and completed by using a combination of hardware and software modules in the decoding processor. The software module may be located in a mature storage medium in the art, for example, a random access memory, a flash memory, a read-only memory, a programmable read-only memory, an electrically erasable programmable memory, or a register. The storage medium is located in a memory. The processor reads information in the memory and completes the steps in the foregoing methods in combination with hardware of the processor.

It may be understood that, in embodiments of this application, the memory may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. By way of example but not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct ramous dynamic random access memory (DR RAM).

In this application, "at least one" means one or more, and "a plurality of" means two or more. The term "and/or" describes an association relationship between associated objects and indicates that three relationships may exist. For example, A and/or B may indicate the following three cases: Only A exists, both A and B exist, and only B exists, where A and B may be singular or plural. A character "/" usually indicates an "or" relationship between the associated objects. "At least one of the following items (pieces)" or a similar expression thereof means any combination of these items, including any combination of singular items (pieces) or plural items (pieces). For example, at least one of a, b, or c may indicate: a, b, c, a and b, a and c, b and c, or a, b, and c, where a, b, and c may be singular or plural.

It should be understood that "one embodiment" or "an embodiment" mentioned in the entire specification means that particular features, structures, or characteristics related to the embodiment are included in at least one embodiment of the present invention. Therefore, "in one embodiment" or "in an embodiment" appearing throughout the specification does not necessarily refer to a same embodiment. In addition, these particular features, structures, or characteristics may be combined in one or more embodiments in any appropriate manner. It should be understood that sequence numbers of the foregoing processes do not mean execution sequences in various embodiments of the present invention. The execution sequences of the processes should be determined based on functions and internal logic of the processes, and should not be construed as any limitation on the implementation processes of embodiments of the present invention.

The terms such as "component", "module", and "system" used in this specification are used to indicate computer-related entities, hardware, firmware, combinations of hardware and software, software, or software being executed. For example, a component may be, but is not limited to, a process that is run on a processor, a processor, an object, an executable file, an execution thread, a program, and/or a computer. As illustrated by using figures, both a computing device and an application that runs on the computing device may be components. One or more components may reside within a process and/or an execution thread, and a component may be located on one computer and/or distributed between two or more computers. In addition, these components may be executed by various computer-readable media that store various data structures. The components may communicate by using a local and/or remote process and based on, for example, a signal having one or more data packets (for example, data from two components interacting with another component in a local system, a distributed system, and/or across a network such as the Internet interacting with other systems by using the signal).

It should be further understood that "first", "second", and various numerical symbols in this specification are only used for distinguishing for ease of description, and are not intended to limit the scope of embodiments of this application.

It should be understood that the term "and/or" in this specification describes only an association relationship between associated objects and indicates that three relationships may exist. For example, A and/or B may indicate the following three cases: Only A exists, both A and B exist, and only B exists. When only A or only B exists, a quantity of A or B is not limited. In an example in which only A exists, it may be understood that there are one or more A.

A person of ordinary skill in the art may be aware that, in combination with units and algorithm steps of the examples described in embodiments disclosed in this specification, this application may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may or may not be physical units, and may be located in one position, or may be distributed on a plurality of network units. Some or all of the units may be selected based on an actual requirement to achieve the objectives of the solutions of embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for indicating a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A random access preamble transmission method, comprising:
receiving indication information, wherein the indication information indicates a first value that is used to determine a channel power used to send a random access preamble based on the following:

$$P_{PRACH,b,f,c}(i)=\min\{P_{CMAX,f,c}(i),(P_{PRACH,target,f,c}+PL_{b,f,c}+G_{offset})\}$$

wherein $P_{PRACH,b,f,c}(i)$ represents the channel power used to send the random access preamble, $P_{CMAX,f,c}(i)$ represents a maximum power for sending a signal by a terminal, $P_{PRACH,target,f,c}$ represents an expected receive power, PL f represents a path loss for transmitting a synchronization signal block (SSB), and $G_{offset}$ represents the first value; and
sending the random access preamble, wherein the random access preamble is used by the terminal to perform random access.

2. A random access preamble transmission method, comprising:
sending indication information, wherein the indication information indicates a first value that is used to determine a channel power used to send a random access preamble based on the following:

$$P_{PRACH,b,f,c}(i)=\min\{P_{CMAX,f,c}(i),(P_{PRACH,target,f,c}+PL_{b,f,c}+G_{offset})\}$$

wherein $P_{PRACH,b,f,c}(i)$ represents the channel power used to send the random access preamble, $P_{CMAX,f,c}(i)$ represents a maximum power for sending a signal by a terminal, $P_{PRACH,target,f,c}$ represents an expected receive power, $PL_{b,f,c}$ represents a path loss for transmitting a synchronization signal block (SSB), and $G_{offset}$ represents the first value; and
receiving the random access preamble sent by the terminal, wherein the random access preamble is used by the terminal to perform random access.

3. An apparatus, comprising:
a receiver, configured to receive indication information, wherein the indication information indicates a first value that is used to determine a channel power used to send a random access preamble based on the following:

$$P_{PRACH,b,f,c}(i)=\min\{P_{CMAX,f,c}(i),(P_{PRACH,target,f,c}+PL_{b,f,c}+G_{offset})\}$$

wherein $P_{PRACH,b,f,c}(i)$ represents the channel power used to send the random access preamble, $P_{CMAX,f,c}(i)$ represents a maximum power for sending a signal by a terminal, $P_{PRACH,target,f,c}$ represents an expected receive power, $PL_{b,f,c}$ represents a path loss for transmitting a synchronization signal block (SSB), and $G_{offset}$ represents the first value; and
a transmitter, configured to send the random access preamble, wherein the random access preamble is used by the terminal to perform random access.

4. The method according to claim 1, wherein a transmit beam of the SSB is different from a receive beam of the random access preamble.

5. The method according to claim 1, wherein the first value represents a path loss difference between the path loss for transmitting the SSB and a path loss for transmitting the random access preamble; or the first value represents a beam gain difference between a transmitting beam of the SSB and a receiving beam of the random access preamble.

6. The method according to claim 1, wherein the first value is one of candidate first values, the candidate first values are predefined or configured by a network device; or the first value is one of 1, 2, 3, 4, 5, 6, 7, 8, 9, 10, 11, 12, 13, 14, 15, 16, 17, 18, 19, or 20 dB, or the first value is negative.

7. The method according to claim 1, wherein the SSB is associated with at least two random access occasions, and the sending the random access preamble comprises:
sending the random access preamble on at least one of the at least two random access occasions.

8. The method according to claim 2, wherein a transmit beam of the SSB is different from a receive beam of the random access preamble.

9. The method according to claim 2, wherein the first value represents a path loss difference between the path loss for transmitting the SSB and a path loss for transmitting the random access preamble; or the first value represents a beam gain difference between a transmitting beam of the SSB and a receiving beam of the random access preamble.

10. The method according to claim 2, wherein the first value is one of candidate first values, the candidate first values are predefined or configured by a network device; or the first value is one of 1, 2, 3, 4, 5, 6, 7, 8, 9, 10, 11, 12, 13, 14, 15, 16, 17, 18, 19, or 20 dB, or the first value is negative.

11. The method according to claim 2, wherein the SSB is associated with at least two random access occasions, and the receiving the random access preamble comprises:
receiving the random access preamble on at least one of the at least two random access occasions.

12. The apparatus according to claim 3, wherein a transmit beam of the SSB is different from a receive beam of the random access preamble.

13. The apparatus according to claim 3, wherein the first value represents a path loss difference between the path loss for transmitting the SSB and a path loss for transmitting the random access preamble; or the first value represents a beam gain difference between a transmitting beam of the SSB and a receiving beam of the random access preamble.

14. The apparatus according to claim 3, wherein the first value is one of candidate first values, the candidate first values are predefined or configured by a network device; or the first value is one of 1, 2, 3, 4, 5, 6, 7, 8, 9, 10, 11, 12, 13, 14, 15, 16, 17, 18, 19, or 20 dB, or the first value is negative.

15. The apparatus according to claim 3, wherein the SSB is associated with at least two random access occasions, and the transmitter is configured to:
send the random access preamble on at least one of the at least two random access occasions.

16. An apparatus, comprising:
a transmitter, configured to transmit indication information, wherein the indication information indicates a first value that is used to determine a channel power used to send a random access preamble based on the following:

$$P_{PRACH,b,f,c}(i) = \min\{P_{CMAX,f,c}(i), (P_{PRACH,target,f,c} + PL_{b,f,c} + G_{offset})\}$$

wherein $P_{PRACH,b,f,c}(i)$ represents the channel power used to send the random access preamble, $P_{CMAX,f,c}(i)$ represents a maximum power for sending a signal by a terminal, $P_{PRACH,target,f,c}$ represents an expected receive power, $PL_{b,f,c}$ represents a path loss for transmitting a synchronization signal block (SSB), and $G_{offset}$ represents the first value; and a receiver, configured to receive the random access preamble sent by the terminal, wherein the random access preamble is used by the terminal to perform random access.

17. The apparatus according to claim 16, wherein a transmit beam of the SSB is different from a receive beam of the random access preamble.

18. The apparatus according to claim 16, wherein the first value represents a path loss difference between the path loss for transmitting the SSB and a path loss for transmitting the random access preamble; or the first value represents a beam gain difference between a transmitting beam of the SSB and a receiving beam of the random access preamble.

19. The apparatus according to claim 16, wherein the first value is one of candidate first values, the candidate first values are predefined or configured by a network device; or the first value is one of 1, 2, 3, 4, 5, 6, 7, 8, 9, 10, 11, 12, 13, 14, 15, 16, 17, 18, 19, or 20 dB, or the first value is negative.

20. The apparatus according to claim 16, wherein the SSB is associated with at least two random access occasions, and the receiver is configured to:
receive the random access preamble on at least one of the at least two random access occasions.

* * * * *

UNITED STATES PATENT AND TRADEMARK OFFICE
CERTIFICATE OF CORRECTION

PATENT NO. : 12,279,304 B2
APPLICATION NO. : 17/869556
DATED : April 15, 2025
INVENTOR(S) : Kuandong Gao, Mao Yan and Huang Huang Page 1 of 1

It is certified that error appears in the above-identified patent and that said Letters Patent is hereby corrected as shown below:

In the Claims

In Column 37, In Line 42, In Claim 1, delete "PL f" and insert -- $PL_{b,f,c}$ --.

Signed and Sealed this
Twenty-ninth Day of July, 2025

Coke Morgan Stewart
*Acting Director of the United States Patent and Trademark Office*